United States Patent [19]
McCasland

[11] Patent Number: 5,856,931
[45] Date of Patent: Jan. 5, 1999

[54] METHOD AND SYSTEM FOR IDENTIFYING, ORGANIZING, SCHEDULING, EXECUTING, ANALYZING AND DOCUMENTING DETAILED INSPECTION ACTIVITIES FOR SPECIFIC ITEMS IN EITHER A TIME-BASED OR ON-DEMAND FASHION

[76] Inventor: Martin McCasland, 305 Tarver Rd., Crossett, Ark. 71635

[21] Appl. No.: 717,643

[22] Filed: Sep. 23, 1996

[51] Int. Cl.[6] .................................................. G01B 7/00
[52] U.S. Cl. ............. 364/550; 364/551.01; 364/709.09; 364/709.12
[58] Field of Search ............................... 364/550, 551.01, 364/DIG. 1, DIG. 2, 221, 221.9, 282.1, 709.09, 709.12; 395/11, 902, 903, 906, 68, 911; 235/375; 340/825.54, 825.55, 825.69, 825.72

[56] References Cited

U.S. PATENT DOCUMENTS

| | | | |
|---|---|---|---|
| 4,525,780 | 6/1985 | Bratt et al. | 395/490 |
| 4,811,844 | 3/1989 | Moulding, Jr. et al. | 206/459 |
| 4,827,423 | 5/1989 | Beasley et al. | 364/468 |
| 4,866,661 | 9/1989 | De Prins | 364/900 |
| 4,887,208 | 12/1989 | Schneider et al. | 364/403 |
| 5,081,598 | 1/1992 | Bellows et al. | 364/550 |
| 5,206,818 | 4/1993 | Speranza | 364/550 |
| 5,321,629 | 6/1994 | Shirata et al. | 364/551.01 |
| 5,493,692 | 2/1996 | Theimer et al. | 455/26.1 |
| 5,532,942 | 7/1996 | Kitamura et al. | 364/550 |
| 5,555,376 | 9/1996 | Theimer et al. | 395/200.09 |

OTHER PUBLICATIONS

Feasibility Study, "Project Scope: Lubrication Monitoring," Martin McCasland, Bridge Information Systems, Inc., Jun. 20, 1994.

*Primary Examiner*—James P. Trammell
*Assistant Examiner*—Bryan Bui
*Attorney, Agent, or Firm*—Ray F. Cox, Jr.

[57] ABSTRACT

A process and system for identifying specific items or assets which require time-based or on-demand attention, a method of planning and scheduling activities on the located items or assets, analysis on actions performed relative to the items or assets and adherence to a time-based schedule for scheduled activities. This invention utilizes a system which retains, schedules and performs analysis on all data associated with the identified items organized and documented and allows for grouping into hierarchical and non-hierarchical groupings. Users executing the prescribed schedule use devices to document inspection activities at the point of inspection. The collaboration of these items work in unison to insure activities which require specific, accurate and documented efforts occur as needed as prescribed.

42 Claims, 16 Drawing Sheets

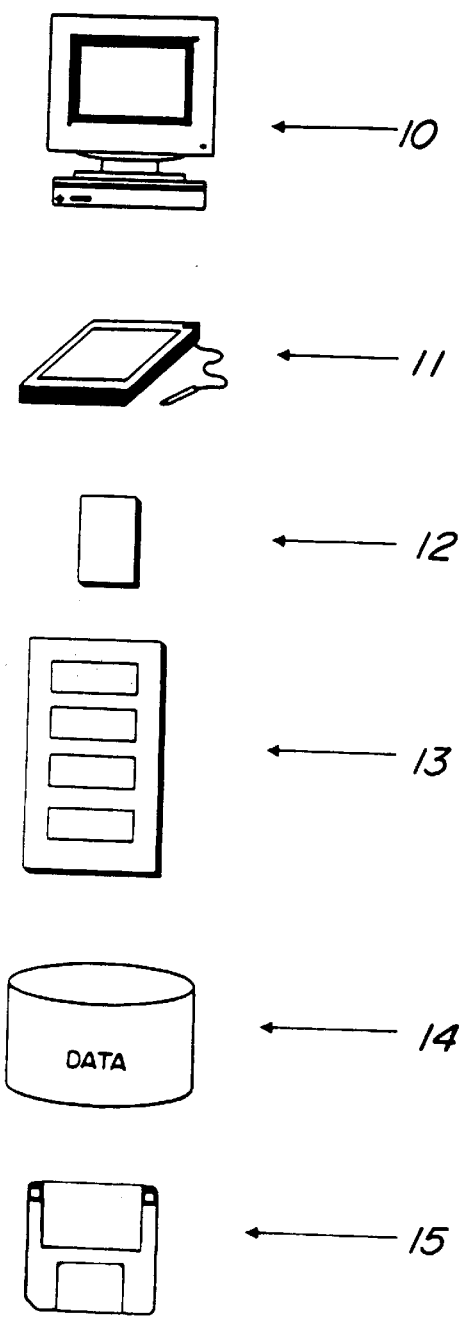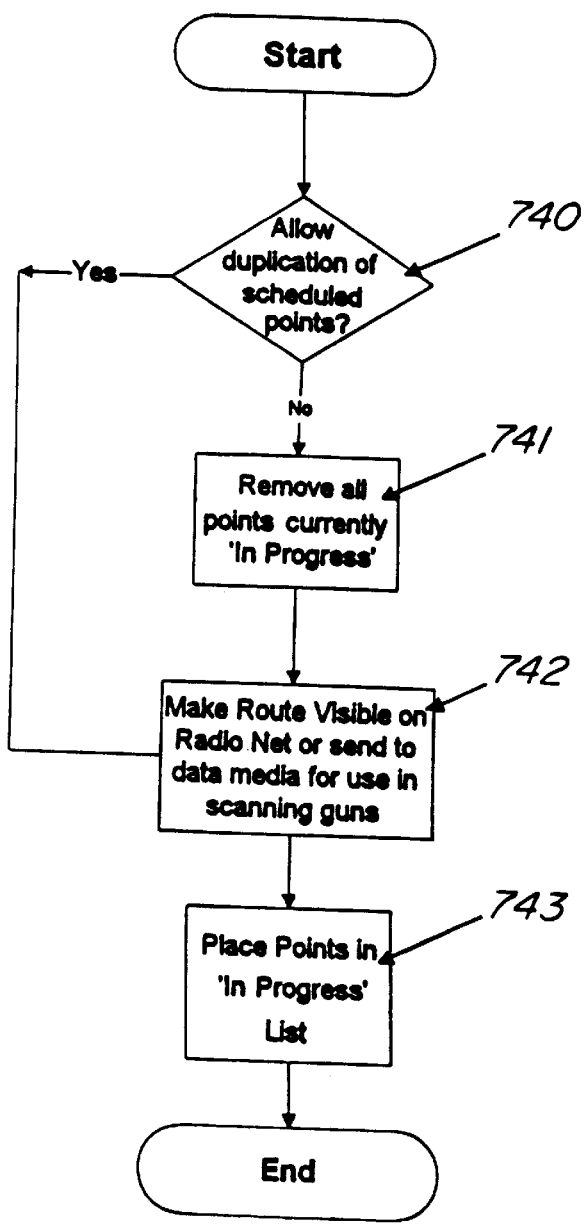

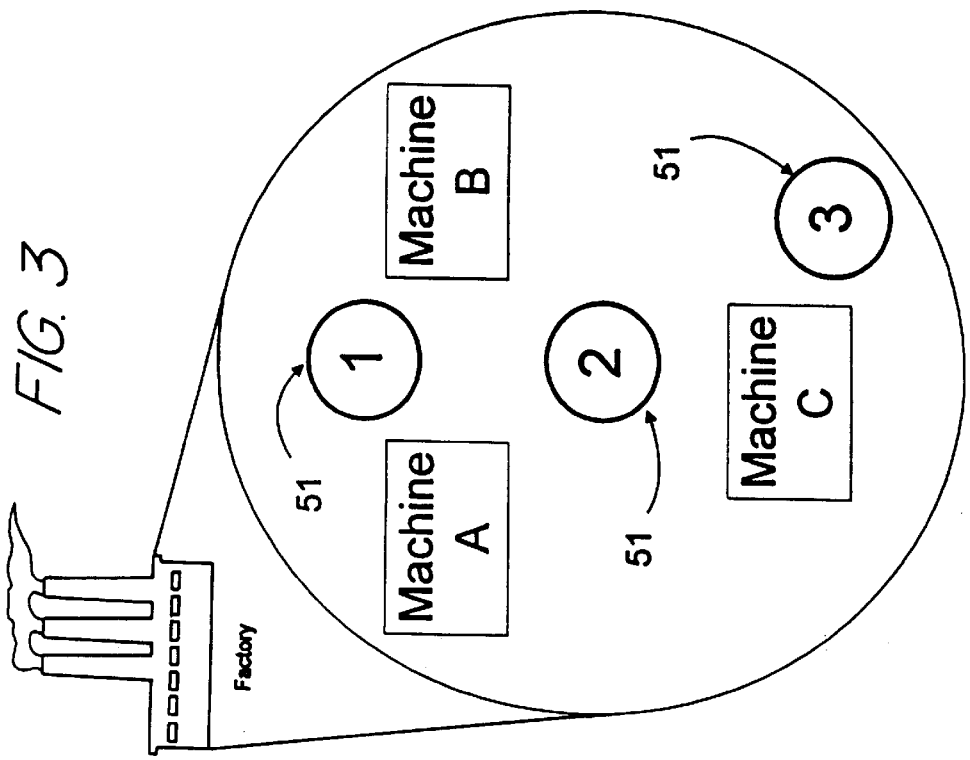
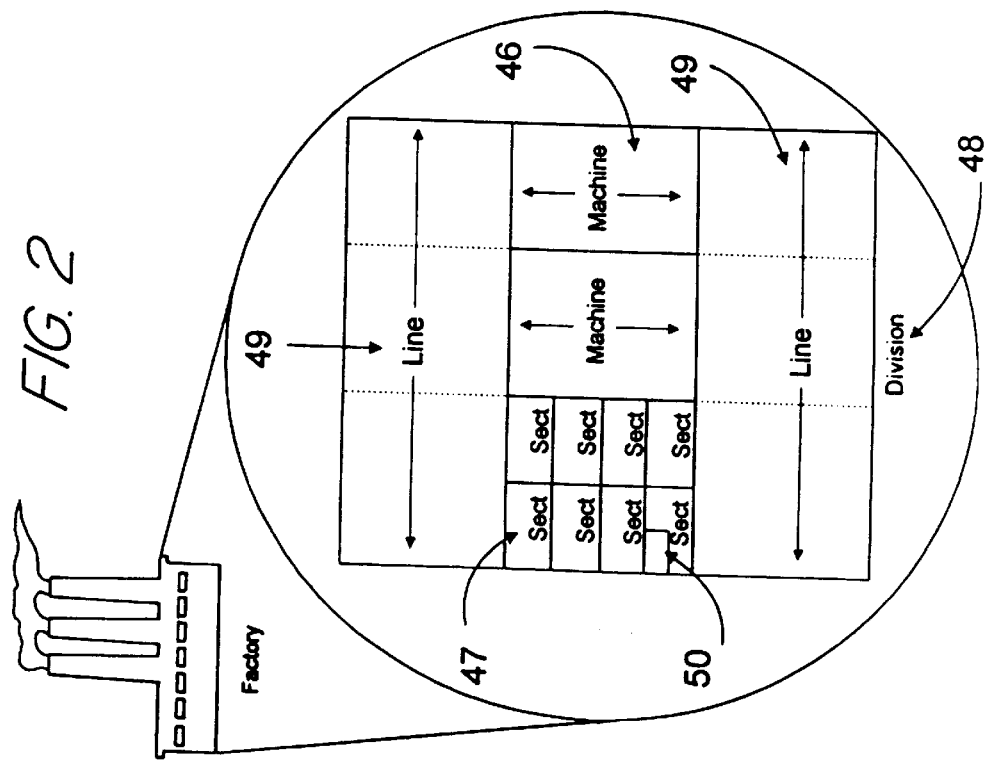

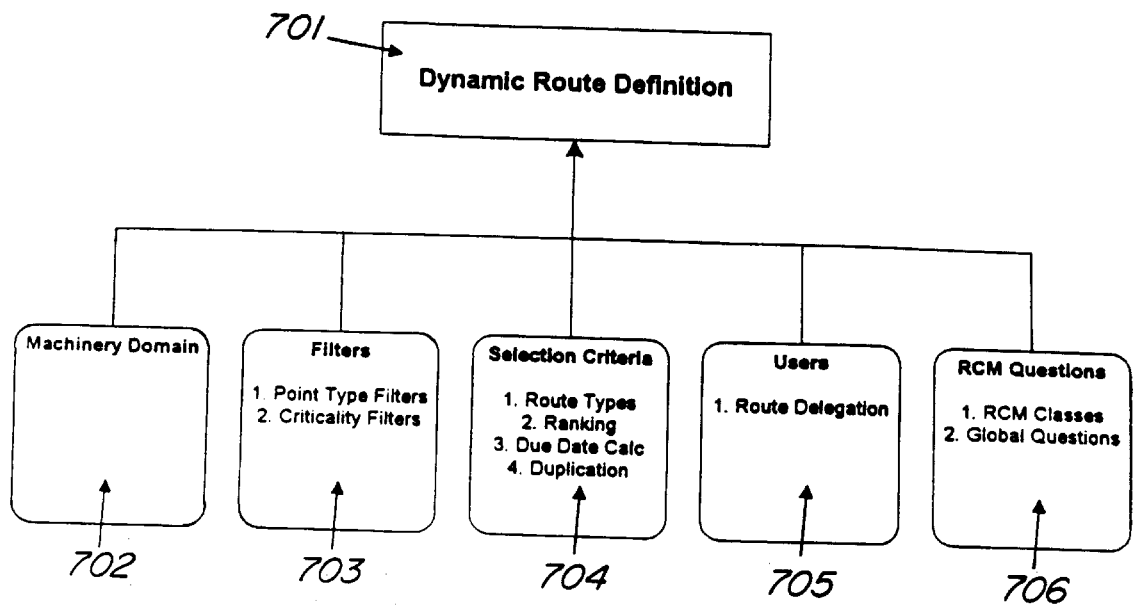
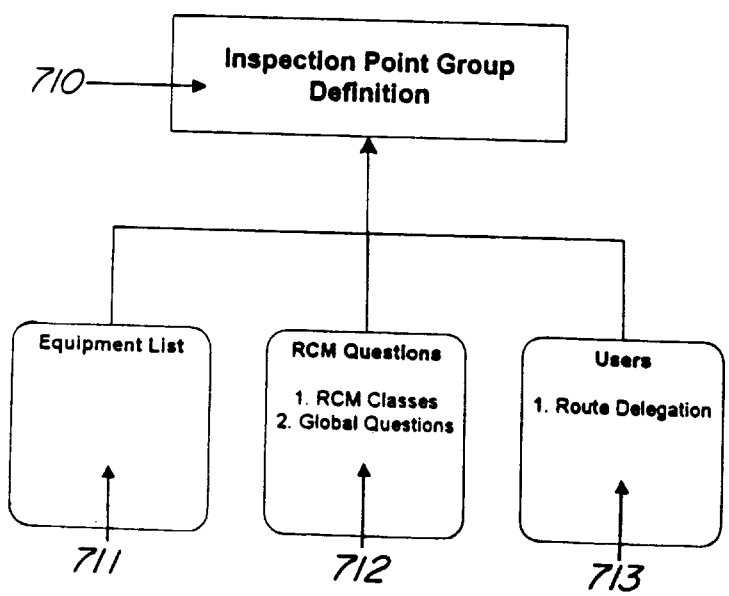

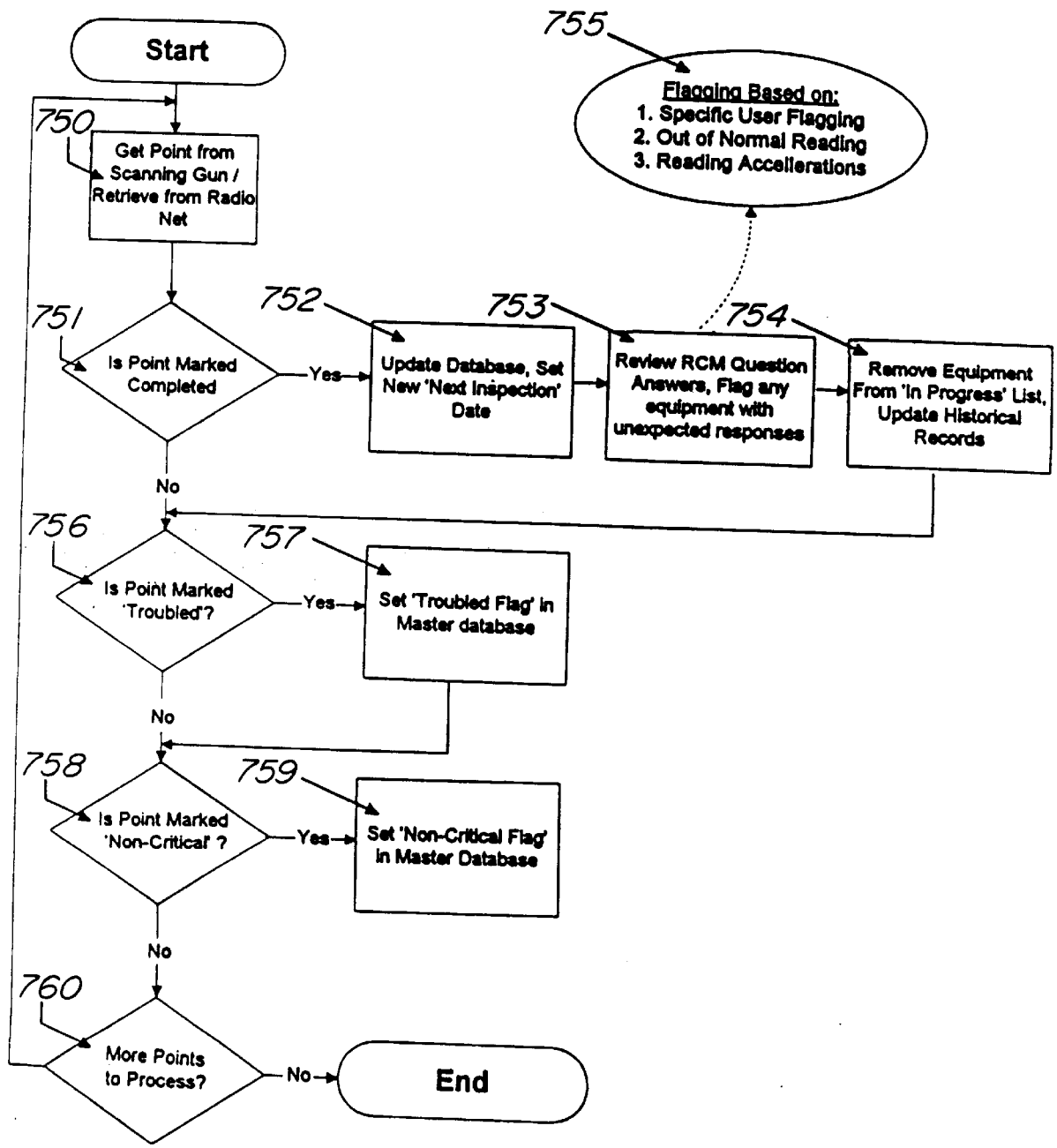

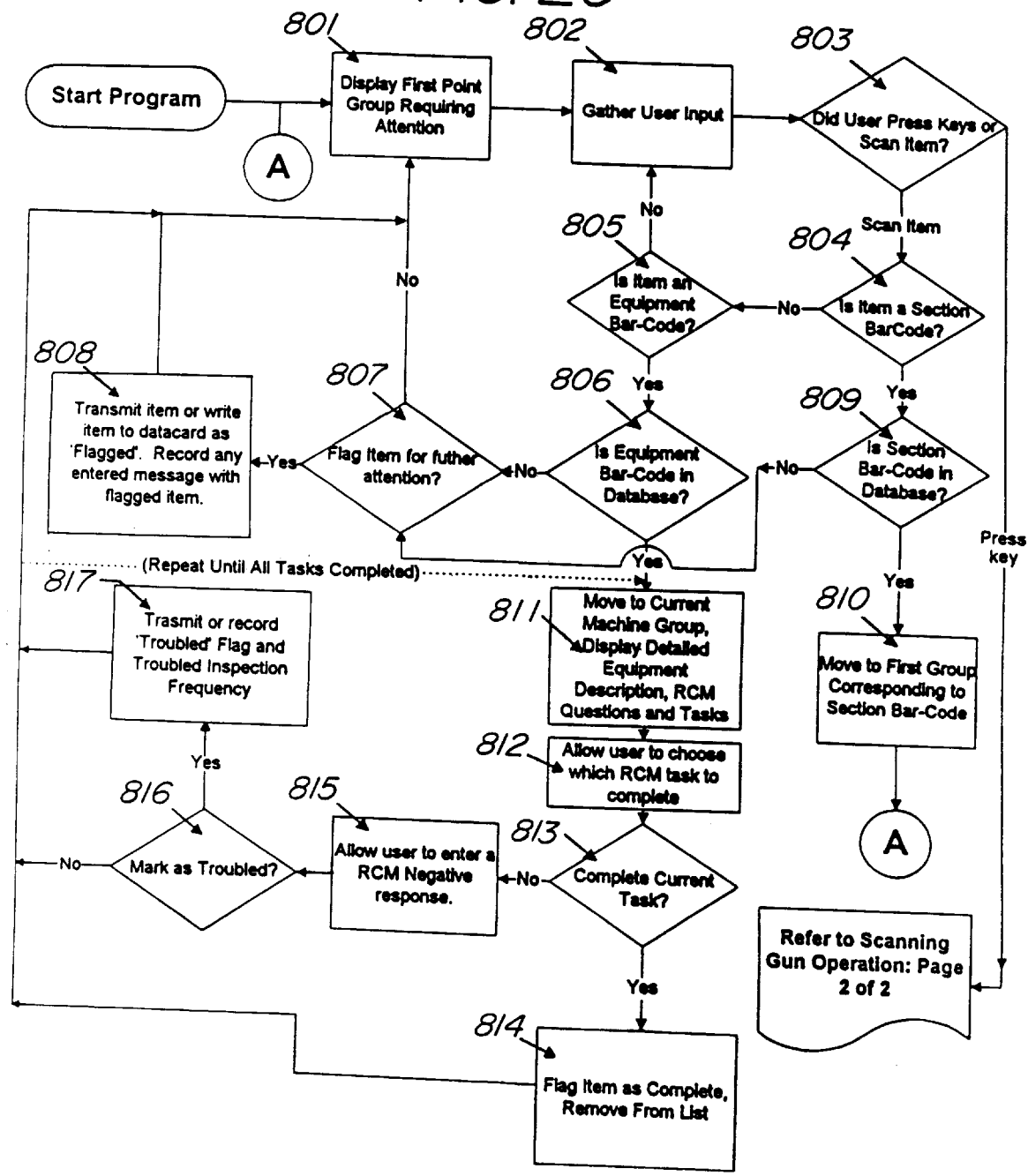

METHOD AND SYSTEM FOR IDENTIFYING, ORGANIZING, SCHEDULING, EXECUTING, ANALYZING AND DOCUMENTING DETAILED INSPECTION ACTIVITIES FOR SPECIFIC ITEMS IN EITHER A TIME-BASED OR ON-DEMAND FASHION

FIELD OF THE INVENTION

For organizations which utilize assets requiring specific inspection activities, the actual scheduling, execution and documentation of these maintenance activities are very tedious and difficult to perform accurately. For example, routine tasks such as machinery lubrication must be performed on a schedule for the task to be effective. Additionally, organizing machinery inspection points into a meaningful manner which allow workers without great knowledge of the machinery to locate and perform tasks is of great value to many organizations which intend to use a diverse group of individuals to perform tasks in an accurate and timely fashion. Accurate and timely attention to maintenance tasks can reduce machinery maintenance expenses by insuring that proper preventive maintenance actions are performed. Also, organizations can increase profit margins by insuring production assets run longer and faster without unplanned downtime through accurate and timely attention to maintenance activities.

The present invention provides for extensive attention and record keeping by both identification of particular items requiring attention and optional organization of these items into groupings which allow for logical and efficient scheduling of prescribed actions.

The present invention accomplishes these tasks in an efficient and extremely documented manner while providing analysis of activities performed and confirmed adherence to an activity schedule. Additionally, through analysis of past activities, the invention is able to provide forecasting information for specifically defined assets.

Also, the process by which the maintenance items are located and organized is unique and provides an efficient method for people familiar or unfamiliar with a particular item requiring attention or action to locate the specific item, perform the require actions and completely document all activities.

Finally, the invention is not limited to maintenance activities. The invention is applicable for any item(s) requiring consistent and well-documented attention.

BACKGROUND OF THE INVENTION

1. Equipment Lubrication

Various businesses from manufacturing concerns to trucking companies purchase and use large amounts of assets in one form or another. These assets, whether a paper machine or truck, must receive timely and accurate attention to assure consistent, safe and affordable operation.

Frequently, the number of points on each asset requiring attention, multiplied by the number of assets owned by an organization, produces a staggering number of items which require attention. Additionally, maintaining meaningful records which show inspection histories and allow for activity analysis is nearly impossible to achieve in an efficient manner.

Also, each individual item does not always have the same inspection frequency. That is, if a machine has 20 lubrication points, all the points are not necessarily inspected at the same time. Ten points may be inspected once every 2 weeks, the remaining 10 lubrication points may be inspected once every 5 days. Therefore, the scheduling burden of insuring each item needing lubrication is nearly impossible to accomplish without some assistance of the invention herein described.

If one of these items fail, users require the ability to quickly view the inspection history for the item. This inspection history becomes a failure analysis tool to examine and hopefully prevent future failures.

Finally, considering the inevitable turn-over of employees, a method to direct new or uninitiated employees to particular pieces of equipment for attention, lubrication or other, is needed to utilize every available man-hour.

In the case of lubrication, insuring the proper lubricant is applied to the proper inspection point is crucial. Therefore, employees must be instructed to use the proper lubricants at the proper inspection point for their activities to be of any value. Proper lubrication of assets is a key strategy to extending asset life and preventing unexpected failures. Through consistent and accurate lubrication, machinery runs more efficiently and longer, thus reducing maintenance costs and improving profitability. Proper lubrication inspection and application by its very nature is a very laborious, banal, time consuming process. Many machines contain hundreds if not thousands of specific locations which require individual attention. Therefore, it has proven necessary to provide users with a means through a method and system herein described to locate specific individual inspection points on a scheduled basis, perform the needed tasks and document the efforts in a manner which does not overly burden a user of average intelligence and skill.

2. Detailed Machinery Inspection

Manufacturing machines often require intense, specialized attention to individual parts. Specifically, one or many questions may need to be asked and answered at each location to insure the proper attention is given to a particular part of a larger asset. This form of intense attention is known as reliability centered maintenance (RCM). This form of maintenance requires personnel to visit particular pieces of machinery, read and respond to various questions and document the responses. These questions may range from simple action statements such as, "Blow dust off motor," to questions requiring a specific reading, "Enter the current temperature of the bearing," to questions requiring a qualitative response, "Answering in numerals from 1–10 describe the condition of the paint on the motor," to yes/no questions, "Is the motor making any squeaking noises?"

Dependent on the answers to these questions by lower-skilled and average-skilled workers on the shop floor, trends can be deduced and maintenance predicted by one or many of the values gathered at each point. However, for this process to be meaningful, great attention must be given to making sure the exact inspection point is located and verified.

The frequency and consistency of visits to specific locations is also very important. To form adequate trends or to administer meaningful attention, the points must be visited on a defined schedule. Therefore, scheduling of the inspections play a very important role.

Proper inspections of assets in a defined manner allow for identification of problems which ordinarily would not be noticed. A user might not realize the temperature recorded for a particular piece of equipment is abnormal. However, the present invention identifies the abnormality and initiates a response to the troubled item. Such responses to individual items may prevent premature failure and reduce overall operating costs.

3. Any process/item requiring specific, detailed, documented inspections on a time based schedule.

Items such as amusement park roller coasters to railroad tanker cars require a precise, consistent, and well documented process (inspection, maintenance or the like) to take place before/during/after operation.

The present invention overcomes the problems and limitations of the prior art as described following.

SUMMARY OF THE INVENTION

The present invention provides a method and apparatus for identifying, organizing, scheduling, executing, analyzing and documenting detailed inspection activities both in a time based and on-demand fashion at a site such as a complex manufacturing facility. Such a facility could contain thousands of items on many machines which require specific, individual attention to insure consistent, efficient and predictable operation.

The present invention organizes inspection points and produces an optimized schedule for action. The method and system of the present invention integrates inspection points which can be organized in both hierarchical and non-hierarchical groupings to be scheduled for certain tasks or inspection activities. These tasks or inspection activities are performed with individual attention to each specific inspection point. The invention determines which points receive specific attention based on multiple selection criteria both calculated by the method of the invention and input by the user. An organized database concerning the inspection points is maintained as part of the invention.

Inspection points can either be scheduled on a time-based or an on-demand fashion. Optimized routes are determined from values such as, but not limited to: time since last inspection, organization grouping to which the inspection item belongs, relative importance or criticality of the inspection item to other inspection items or criticality of the grouping to other groupings.

Once an optimized inspection route is determined, the present invention provides directions to the user and instructions for activities and tasks relative to each inspection point(s) on the optimized schedule. This is achieved through the use of a device which can be, but is not required to be, portable and utilized by an individual user. In various embodiments, this device is hereinafter referred to as a scanner, gun, or portable device. In a preferred embodiment, the portable device is a hand held unit with data processing capabilities, the capability of reading from and writing to a data card such as a PCMCIA card, manual input such as a keypad, a display, and an integrated laser scanner particularly adapted for bar code scanning.

The location of a particular inspection and confirmation that the proper inspection point is located is provided by an identifying element located at each inspection point. The user performs specific actions as directed by the portable device and records activities or information by using the device to read or deduce a unique code, such as a bar code, from the identifying element, which may be a bar coded tag, attached at or near the inspection point. (In an alternative embodiment, the Global Positioning System, GPS, could also be utilized to uniquely identify specific locations via satellite signals and triangulation performed by the portable device. This alternate method is viable when only the location of specific inspection points are important, but the item in the location can be changed. The goal is to make sure that whatever item is occupying a certain location is properly inspected and documented.) Information gathered or transmitted by or from the portable device is used for archival purposes to determine information such as past inspection histories, schedule adherence based on predetermined ideal inspection frequencies, trends based on readings gathered at each inspection point, future inspection routes based on which points were inspected and activity analysis of specific users based on data gathered using the devices or any other method of activity documentation. The portable device may, for example, accumulate data for transfer by PCMCIA card to another data processor or could transfer data by other means such as radio frequency (RF) transmission.

In a preferred embodiment, the element uniquely identifying a particular inspection point would be a bar-code. However, any means whether electronic or other could be used as long as a method exists for the item to provide a machine readable image or signal, electronic or other, readable by the portable device. This signal uniquely identifies the inspection point.

Also, as described above a transmitted signal from the GPS, Loran or other yet undeveloped navigational or geographical location systems could be used to triangulate a very specific location and therefore uniquely identify a specific location eliminating the need for any tag or other identifier at the individual inspection locations.

The GPS, Loran or other system could also direct workers to specific asset locations via the aforementioned triangulation by the portable devices. This triangulation could be integrated with site maps or CAD drawings on the portable device to provide a moving map of a facility with items requiring inspection highlighted on the map.

Additionally, in a preferred embodiment, the portable device would contain a human readable display. Although the invention is not limited to this embodiment, the display would provide users the means to obtain additional information relative to a specific inspection point or group of inspection points or allow for directing users to perform specific activities or gather specific data at the uniquely defined and identified inspection points.

The data gathered by the user and the data created automatically by the device relative to the specific inspection activities can either be stored on a medium which allows later transfer to a device for interpretation and data storage, such as the aforementioned PCMCIA card, or the data can be immediately transferred or transmitted to a device, location or person for like purposes.

In a preferred embodiment of the invention, a central computer system would either contain an archived database or provide access through a networked communication method to a storage location containing the archived data. This central computer or basestation performs the selection and routing tasks in addition to maintaining the archived database. In turn, the basestation either transmits the assembled inspection points deemed ready for inspection or stores the assembled points on a medium, such as the PCMCIA card in a preferred embodiment, which allows transfer to the portable device and utilization by the user performing the route. In preparing a route of activities prescribed for specific inspection points, the user may instruct the basestation to filter points relative to substances or items to be administered to particular points, classifications of individual inspection points, or related grouping of inspections points.

During an inspection, users also have the ability to flag points which require further attention. Additionally, the users can denote the level of concern which should given to each point such as a suggested troubled inspection frequency which should be given to the particular point until a problem is solved. Additionally, users can flag individual points with a low-priority designation for reasons such as misspelled description designations, inaccurate grouping information, or the like.

It is therefore an object of the invention to provide an ergonomically sensitive method and system for identifying points requiring inspection, optionally organizing these points in a meaningful manner to allow for efficient location, scheduling of located points to assure consistent attention is given, execution of inspections in a precise and timely fashion, documentation of all inspection efforts with little burden on end users and analysis of inspection efforts to predict future problems, examine past failures, and identify trends in inspection activities.

This invention further provides for the data of the above described activity to be exported to any person or machine for further analysis, storage, communication or utility.

Further objects and advantages of the present invention will be apparent from a consideration of the following detailed description of the preferred embodiments in conjunction with the appended drawings as briefly described following:

BRIEF DESCRIPTION OF THE DRAWINGS

FIG. 1 is an iconic representation of the physical components which comprise the invention.

FIG. 2 is a diagram depicting a hierarchical organization method for grouping inspection points.

FIG. 3 is a diagram depicting a non-hierarchical organization method for grouping inspection points.

FIG. 15 illustrates the elements used to create a Dynamic Route Definition.

FIG. 16 illustrates the elements used to create a Point Group Definition.

FIG. 18 illustrates the selection process involved when a Point Group Definition is chosen for execution.

FIG. 19 illustrates the process involved when an inspection route is completed and the associated data is uploaded to the basestation.

FIG. 20 is the first of two illustrations describing the operation of the scanning gun software.

DETAILED DESCRIPTION OF THE PREFERRED EMBODIMENTS

The following description uses a large manufacturing plant as an example for clarification. In no way is the invention limited to manufacturing or any other industry. This example of a large manufacturing facility consists of seven components as depicted in FIG. 1.

Basestation 10 is a data processing device such as a personal computer which users utilize to schedule routes and perform various analysis and reporting functions relative to the inspection points on the various machines.

Figure 22:
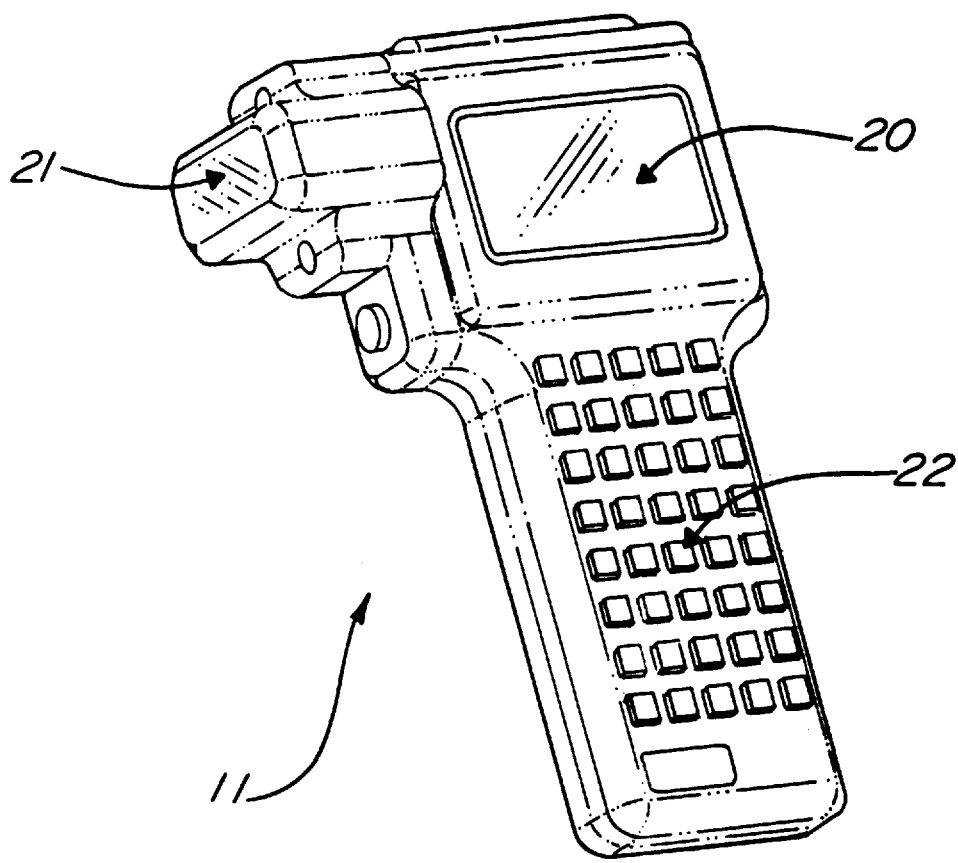
FIG. 22 is an illustration of a scanning device which can be used to perform the inspection routes.

Portable device 11 is used to direct users to various inspection points in a facility and perform specific actions or gather data. In a preferred embodiment of the invention as shown in FIG. 22, portable device 11 has a display screen 20 capable of displaying text to inform users of the location of specific inspection points and instruction relative to the required activities at each inspection point. Additionally, in a preferred embodiment, the portable device is provided with a laser bar code scanner 21, means to transfer data to and from a PCMCIA or similar type of data card (not shown) of a type well known in the art, and manual input means such as a keypad 22. From this point forward, portable device 11 may be referred to as a portable device, or in particular embodiments, a gun, or a scanning gun.

Data card 12 is preferably of the type known as a PCMCIA card which holds data created by the basestation 10 and is used by the portable device 11 to supply specific information relating to inspection points and routing information. The data gathered is also stored on data card 12 for later transmission back to the basestation 10 and thence to a central or primary data processing device. In alternative embodiments of the invention, portable device 11 may utilize a means of data transmission in which a data card 12 is not utilized, such as radio frequency (RF) transmission. Hereinafter data card 12 may be referred to as a PCMCIA card in particular embodiments.

Identifying element 13 is affixed at or near all inspection points. Identifying element 13 has the ability to transmit, convey or display a machine readable message which uniquely identifies the inspection point. In a preferred embodiment, identifying element 13 is a bar coded tag. Identifying element 13 may be referred to hereinafter in particular embodiments as a bar coded tag or simply as a tag. In alternative embodiments, identifying element 13 may be a form of geographical locating system and may utilize RF communication means.

Database 14 includes all information related to the individual inspection points, archived inspection histories, and unique tag information. Database 14 may reside on basestation 10, or some other device location utilizing network communication technology or any other method of data transmission to a specific location.

Process and system software 15 manipulates database 14 to present data, analyze data, formulate inspection routes, transmit the relevant information to portable device 11, operate portable device 11 and any associated hardware required to practice the invention. The system software operates by interactions between six distinct modules. Module 501 involves entry of information relative to specific user names, products being used in various inspections, criticality settings, specific point types, specific machine types, purchase and distribution units and multiples, hierarchical organization settings, non-hierarchical organization settings, machinery section data, equipment data and specific RCM maintenance task information.

Module 502 involves scheduling of RCM tasks to be performed relative to equipment specified in Module 501 based on factors derived both from existing system data and user input. In the user requests an inspection route only for items which are currently due for inspection, the system retrieves the last known inspection date of each RCM task and compares this time elapsed from this data to the desired inspection frequency of the specific task. If the desired inspection frequency is less than the elapsed time, then the inspection point is considered due for inspection. Also, if the user wishes a ranked list in order of importance of RCM tasks requiring attention, the system will perform the same described comparison of elapsed time to desired inspection frequency and perform additional calculations based on the criticality designation assigned to each element along with a calculation which further weighs each task relative to the desired inspection frequency to produce a numerical number denoting importance. This list of numerical numbers, which correspond to specific RCM tasks on specific equipment, is then sorted in descending numerical order to deduce, in order, which equipment is most in need of inspection.

Module 503 takes routes definitions created by Module 502 and manages the actual transfer and execution of the route information. Specifically, this module records which user is performing the route and handles the transfer of the data to a desired device or medium. Module 503 also encompasses the specific routines performed by the Scanning Guns 11 used in the execution of route tasks. All information relative to the person which performed each task, the date and time which all tasks were performed, which equipment was inspected, which equipment was flagged for further attention along with the count or quantity of products used to perform inspection is gathered and stored by Module 503.

Module 504 provides analysis on activities performed and recorded by Module 503. Module 504 reports information such as distribution of inspection activities among users, product usage relative to specific machines, machine types, point types, or hierarchical/non-hierarchical groupings. Module 504 also manages equipment which was flagged as needing further attention in Module 503. These flagged points are visible to supervisor personnel and are designated with specific reasons for being flagged. For example, an equipment item may be denoted as "grease fitting damaged, could not oil. " Therefore, the supervisor personnel have a constant work list from which to plan machinery maintenance. Once the task has been completed, the item can be removed from the list.

Module 505 primarily tracks failures of specific equipment. If a particular item such as a gearbox fails, it is of great value to document the failure. The documentation of this failure allows for future examination of failure trends and frequency. In addition, the interface of Module 505 also allows the failure to be related to the last user to inspect the item which failed or the user which inspected the failed item the most within a given time period. Through the tracking of failures along with the classification of items by the designations of Point Types and Machine Types (described later), the expected life of a particular asset classification can be predicted based on past history.

Module 506 provides a quick method of determining adherence to an inspection schedule. Using the method later described to calculate values such as Percent Overdue and Critical Percent Overdue, users can quickly identify items which greatly need inspection attention. Using this tracking feature of Module 506, users can quickly create routes specifically for the urgently overdue items. In addition, Module 506 provides a measuring yardstick for a particular area of a facility, particular Point Type, particular Machine Type or particular user relative to adherence to and performance of scheduled inspection activities.

Figure 8:
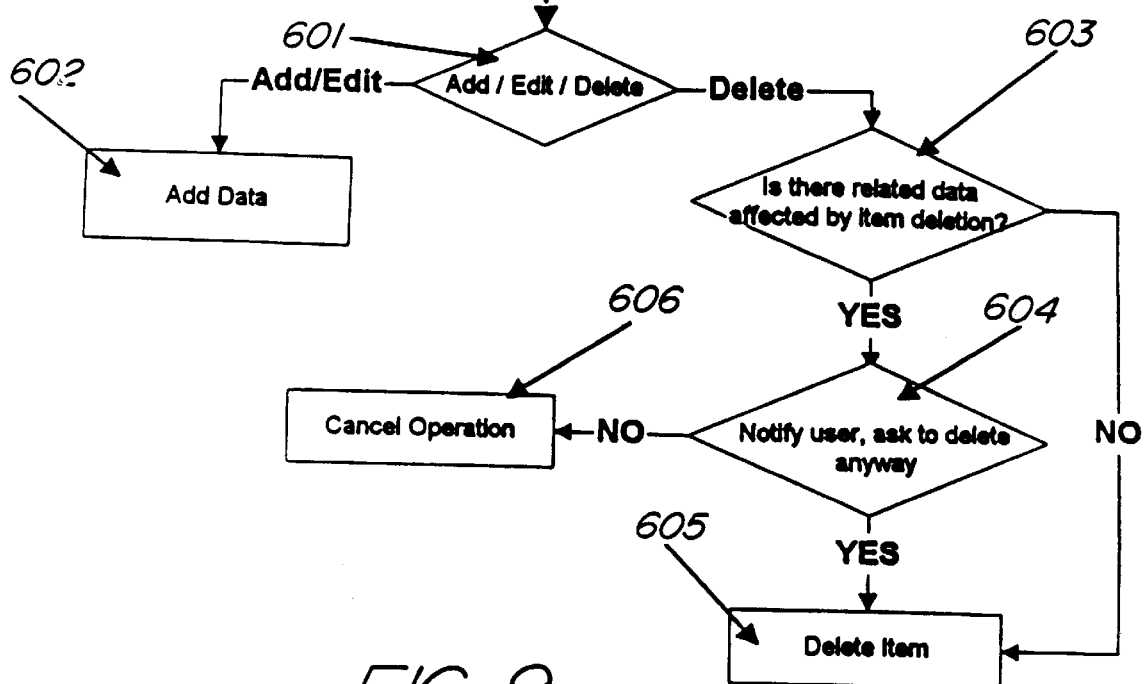
FIG. 8 is a generic process example of data entry procedures throughout the software.

Data entry into software 15 installed on basestation 10 is the first step of installation. All data entry occurs in the same basic method. As illustrated in FIG. 8, the user chooses whether to add, edit or delete a specific item at program location 601. If the user has chosen to add or edit data the program progresses to location 602 which corresponds to the appropriate data entry screen for the data being deleted.

If a user desires to delete an item, the program progresses to program location 603 and determines if deletion of the data item can be allowed based upon dependencies within the internal data structure of the program. (E.g., a user wishes to delete a certain Product; however, the product is used in several RCM Questions. The system will not allow deletion of the product since such a deletion would cause a system error when executing RCM Tasks which required the Product.)

If the system determines no adverse affects will occur if the data item is deleted, then the system progresses to program location 604 and confirms the user wishes to permanently delete the data item. If the user chooses "yes," the data item is deleted. Otherwise, the execution of the program is returned to program location 601 and the item is not deleted.

Figure 9:
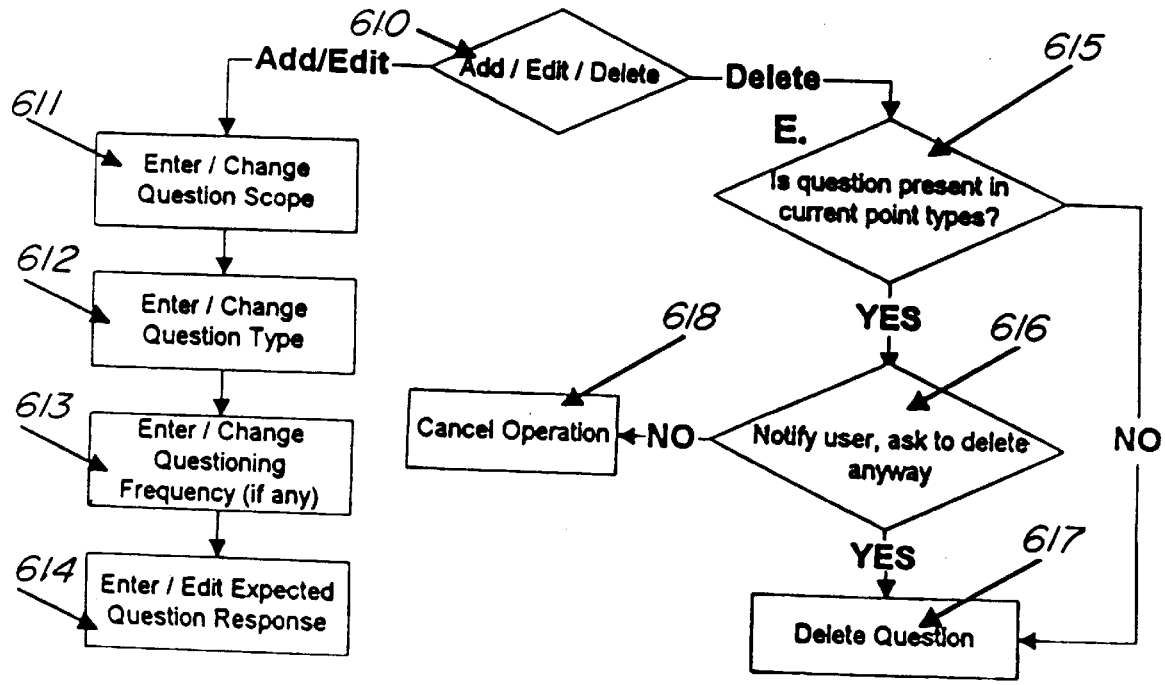
FIG. 9 is a process example of RCM Question management in the software.

As illustrated in FIG. 9, RCM Question Management data entry is slightly different. If a user wishes to add or edit a RCM Question at program location 610, the system progresses to program location 611. At location 611, the scope of the RCM Question is chosen. The scope of the RCM question determines with what particular Point Types a certain RCM Question should be executed. (E.g., specific inspection instructions for a certain electrical motor would not be appropriate for a gearbox. Therefore, RCM questions are classified according to which Point Type they are most closely related.) After the scope of the RCM Question has been determined, the program progresses to execution point 613 and the frequency in which the specific RCM Question or Task is executed is set or changed. Finally, the program progresses to program location 614 and the expected answer to the RCM question is given along with a present list of possible negative response answers. Using these expected responses, the system can quickly determine a list of machinery which needs attention based on answers gathered in during an inspection. If an RCM Question was answered in a manner which was not expected, then the equipment corresponding to the RCM Question warrants further inspection. As mentioned, a present list of negative responses can be given to provide further information for negative responses. (E.g., the user could be presented with a list such as "A. Could not inspect because machine running. B. Pressure gauge damaged, could not take reading, etc.")

Figure 7:
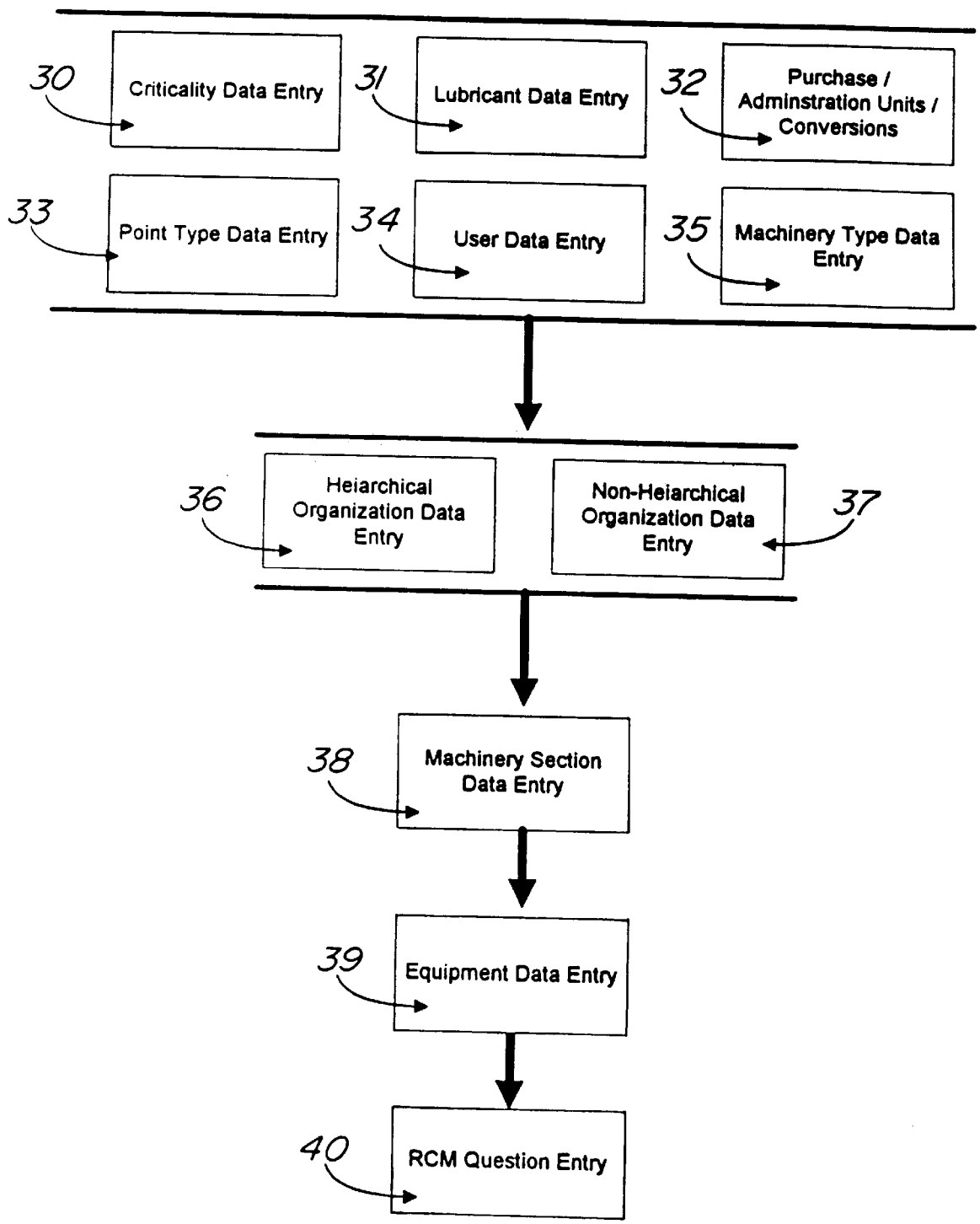
FIG. 7 is an overview of the process and order with which data entry occurs with regard to software usage.

As illustrated in FIG. 7, all data associated with criticality designations 30, lubricants 31, purchase and administration units 32, point type data 33, user data 34 and machinery type data 35 is performed first. Then, hierarchical 36 and non-hierarchical 37 data entry takes place. Afterwards, entry of machinery section data 38, equipment data 39, and RCM question management data 40 take place, in that order as illustrated in FIG. 7. Each of these data entry types will be discussed following.

Criticality data 30 is entered with respect to two separate classifications: Equipment Criticalities and Machine Criticalities. Both criticality designations contain three distinct data elements: a criticality name, description and multiplier factor. These designations are used to rank and prioritize inspection elements. For example, a specific point type may be designated criticality A with a description reading "Extremely Important, very sensitive to proper inspection" and have a multiplier of 1.5. Likewise, a machine could be designated criticality B with a description reading "Above average profit earning machine" with a multiplier of 1.1. These criticalities are utilized when users request the system to rank items in order of items needing inspection. To achieve this task, software 15 performs the following calculation:

$$\frac{(DPD)}{(NIF)} \times (MCrit) \times (ECrit)$$

where: DPD=Days Past Due
NIF=Normal Inspection Frequency
Mcrit=Machine Criticality
Ecrit=Equipment Criticality This calculation takes the days past due of each element being inspected and divides this value by each element's normal inspection frequency. This value gives a relative weighting of an element's overdue severity. Then, the criticality factor of both the machine to which the element belongs and the point type class to which the element belongs is multiplied by this value. Then, all of these values are ranked to give a list, in order of descending importance, of all items requiring inspection based on each element's overdue status based on a normal inspection value, the class of equipment to which the item belongs and the profitability or importance of the machine to which the item belongs.

Lubricant data 31 is simply a list of lubricants or associated items which are used by individual machinery elements. These items are linked through the RCM Question Module 40. For example, an RCM Question could be entered to schedule lubricant inspections or additions once every 30 days, complete lubricant changes every 180 days, and oil filter changes every 60 days.

The Purchase/Administration Units/Conversions module 32 is used to convert items purchased in bulk quantities to usable administration units. For example, oil may be purchased in 55 gallon quantities but administered in pint quantities. Module 32 is used to track cost per administration to identified equipment elements.

Figure 12:
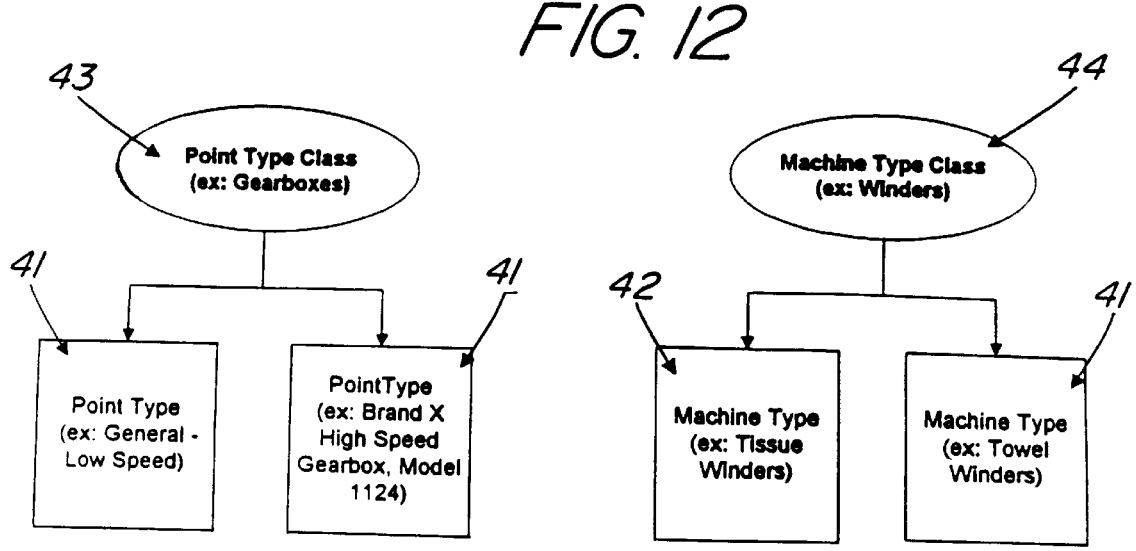
FIG. 12 illustrates the definition and relation of Point Type Classes and Point Types.

The Point Type 33 and Machine Type 34 modules are illustrated in FIG. 12. These modules are used to classify equipment for reporting reasons and aids in managing large amounts of equipment elements. As shown in FIG. 12, both Point Types 41 and Machine Types 42 are used to denote specific equipment types and machinery classifications, respectively. Both of these items are further related in more general classifications known as Point Type Classes 43 and Machine Type Classes 44.

Figure 13:
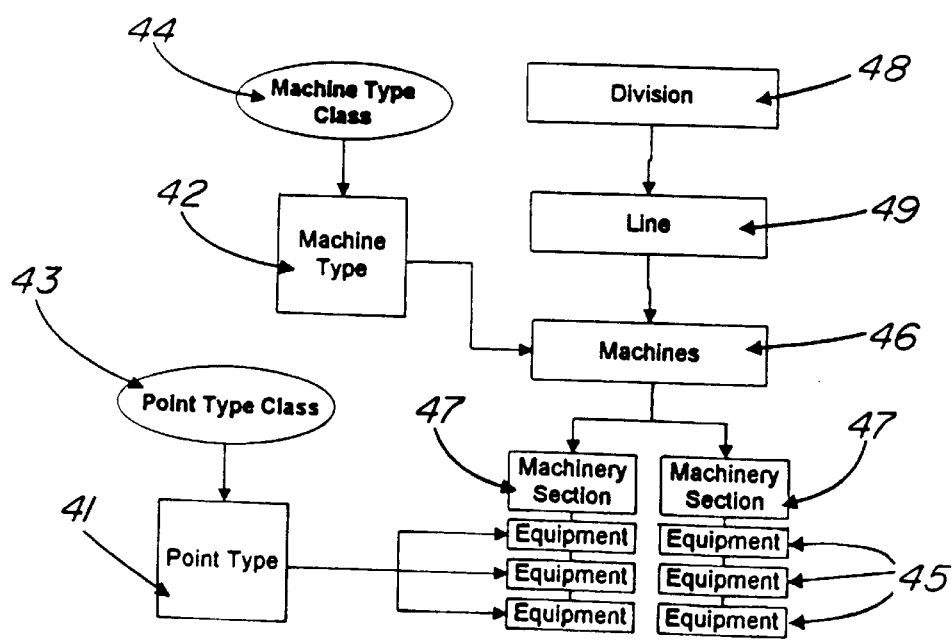
FIG. 13 illustrates the relation and coexistence of Point Type Classes, Point Types, Machine Type Classes and Machine Types in the hierarchical data organization scheme.

The relation of Point Types 41 and Machine Types 42 are illustrated in FIG. 13. As shown, Point Types 41 are related directly to specific equipment elements 45. (E.g., Specific Equipment "ACME Widget Model 112 on #4 Machine near fire exit" would be the specific equipment element 45. Equipment element would be related to a specific Point Type 41 of "ACME Model 112 Widgets". These items could be further classified by a Point Type Class 43 as "ACME Widgets". Therefore, the "ACME Widgets" Point Type Class could contain many specific Point Types: "ACME Model 110 Widgets, ACME Model 350 Widgets, etc.")

The Machine Type designations 42 contain a very similar relation except that these classifications are used to classify and organize machinery types 46 in a facility. (E.g., a facility may contain many chocolate production machines. A specific machine could be "#10 Alpine White Chocolate Machine." The Machine Type 42 could by "Alpine Chocolate Machine" and the Machine Type Class 44 could be "Chocolate Machines." As in the case of Point Type Classes 43, many specific Machine Types 42 could be related to the Machine Type Class 44 "Chocolate Machines." Some examples could be "Butterscotch chocolate machines, Alpine Chocolate machines, etc.")

Machine Types 42 are related to specific machines 46 only, Point Types 41 are related to specific Equipment items 45 only as shown in FIG. 13.

Referring again to FIG. 7, the User Data Module 34 contains the names and security levels of the individuals using the system. (E.g., John Smith, Basic User Security. Jane Smith, Administrator Security.) This information is in conjunction with passwords to insure the proper person receives access to the system and inspection routes. Also, considering that the system records who inspected every item, the system provides this level of security to insure the validity of inspection activity data.

Figure 10:
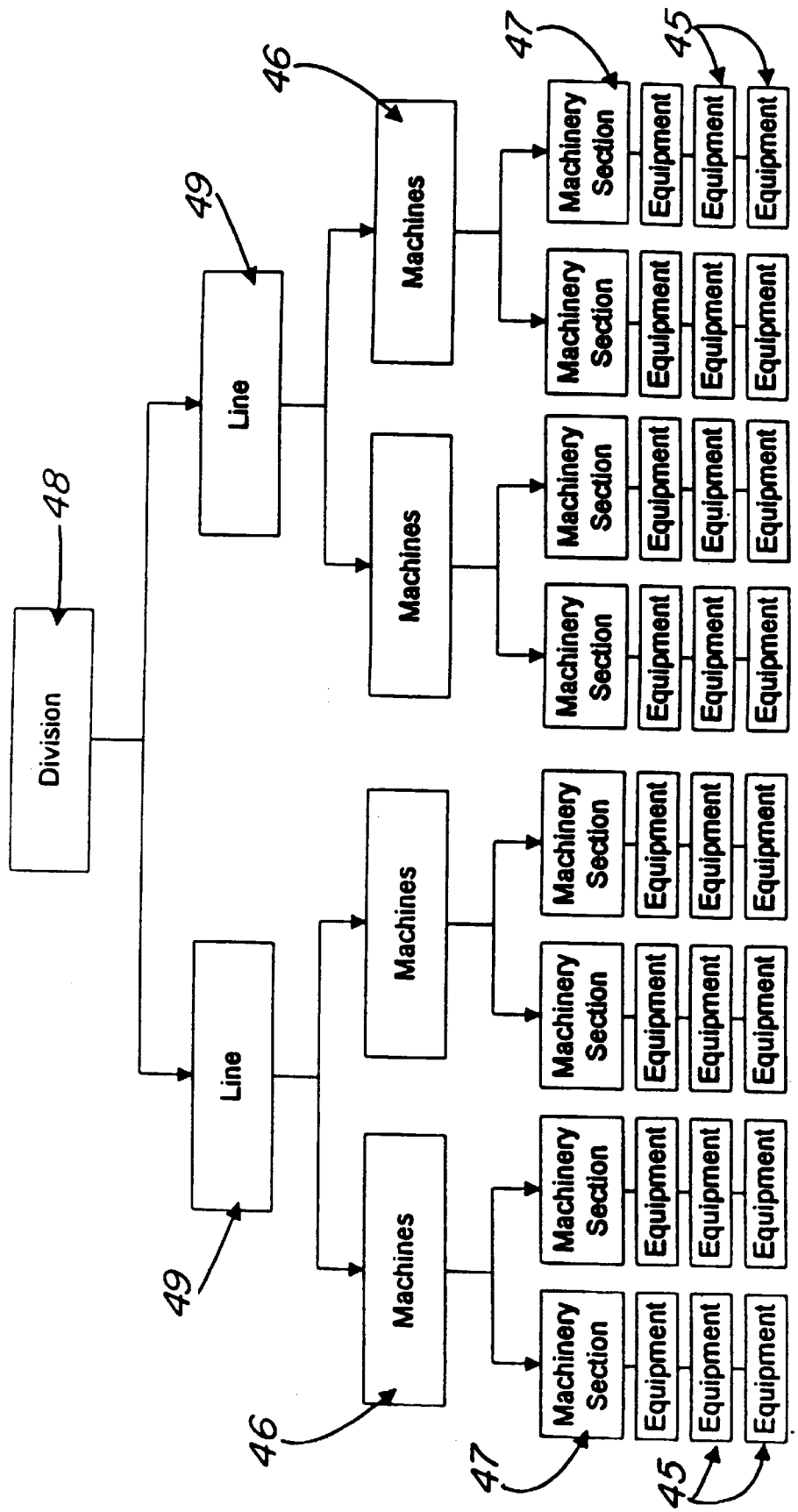
FIG. 10 illustrates the data relation of items with regard to the hierarchical method of organization.
Figure 11:
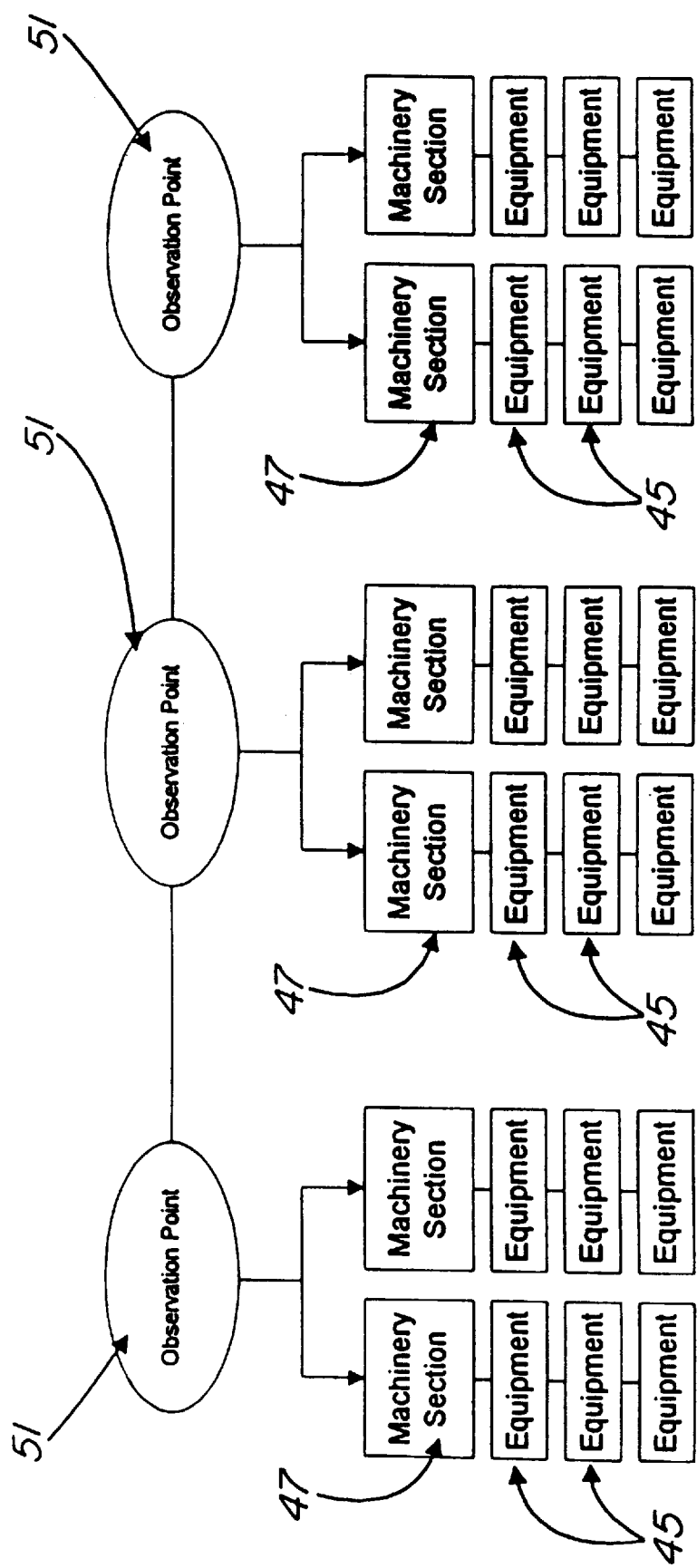
FIG. 11 illustrates the data relation of items with regard to the non-hierarchical method of organization.

The Hierarchical 36 and Non-Hierarchical 37 data organization method for inspections points is discussed with reference to FIGS. 2, 10 and 11.

In FIG. 2, the hierarchical organization method is shown. The example hierarchical method shown depicts five separate levels of detail. In order of increasing specificity, the organization division are: Division 48, Line 49, Machine 46, Section 47, and Inspection Point 50.

Inspection Points 50 correspond to areas on a machine 46 which uniquely define an item or group of like items for which data is gathered or actions executed.

Inspection Points 50 are organized into Sections 47. Sections 47 are comprised of multiple Inspections Points 50. Sections 47 can, but do not always, denote logical section divisions on a physical piece of machinery. Sections 47 are grouped into Machines 46. Machines 46 can, but do not always, denote physical machinery. Machines 46 are grouped into Lines 49. Lines 49 can, but do not always, denote groups of machines which work in unison to perform a specific task. Lines 49 are grouped into Divisions 48.

The names for this method of hierarchical organization can be freely changed, increased in number of groupings, decreased in number of groupings, or for simple installations which do not have overwhelming numbers of inspection points, not used at all. The terms Divisions, Lines, Machines, Sections and Inspection Points described above are used as an example only for a large manufacturing facility.

Non-Hierarchical organizations can exist in a organization method herein referred to as Observation Points 51. As illustrated in FIGS. 3 and 11, Observation Points 51 provide a location method of grouping points. Referring to FIG. 3, each Observation Point 51 is denoted by a circle and numbered appropriately. Observation Point Circle-1 could contain inspection points on both Machine A and Machine B. Observation Point Circle-2 could contain inspection points on all machines (Machine A, Machine B and Machine C), while Observation Point Circle-3 would most likely contain points only on Machine C.

This method of organization can be used in conjunction with the previously described hierarchical method to provide a method of locating and executing tasks related to individual inspection points. In addition, this method of non-hierarchical organization may not be used at all if the site does not require such a method.

To further provide a means of ergonomic ease to the end users of the invention, the Section 47 grouping of Inspection Points 50 is sequenced to provide a defined flow through, around, or in a Machine (physically or by previously defined term) in a way to allow for an efficient method to inspect all Inspection Points 50.

Figure 4:
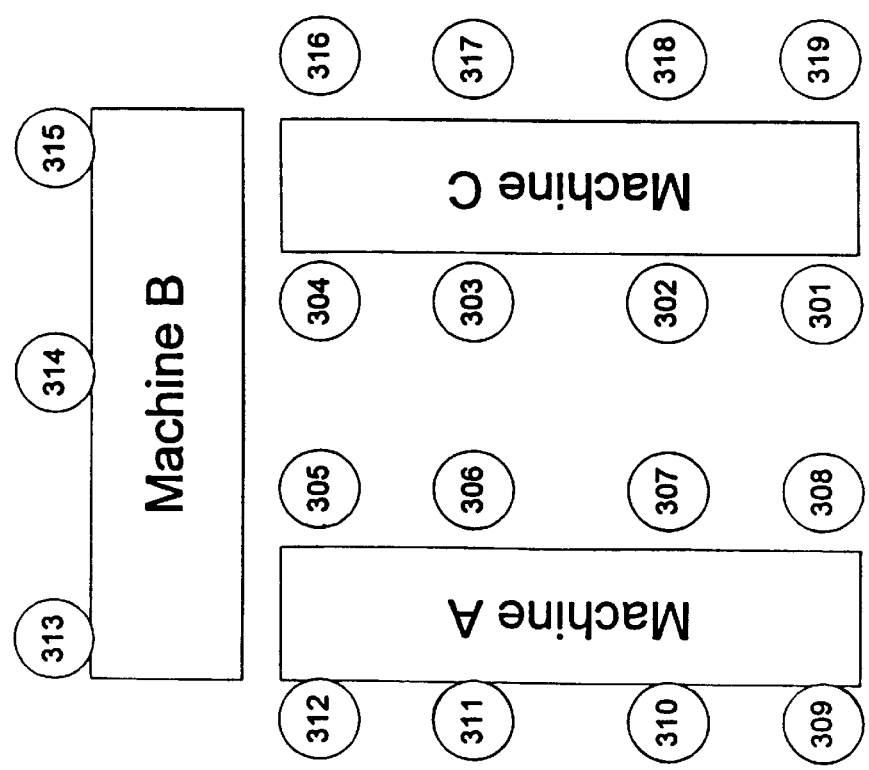
FIG. 4 is an example of section level sequencing on various machinery items.
Figure 6:
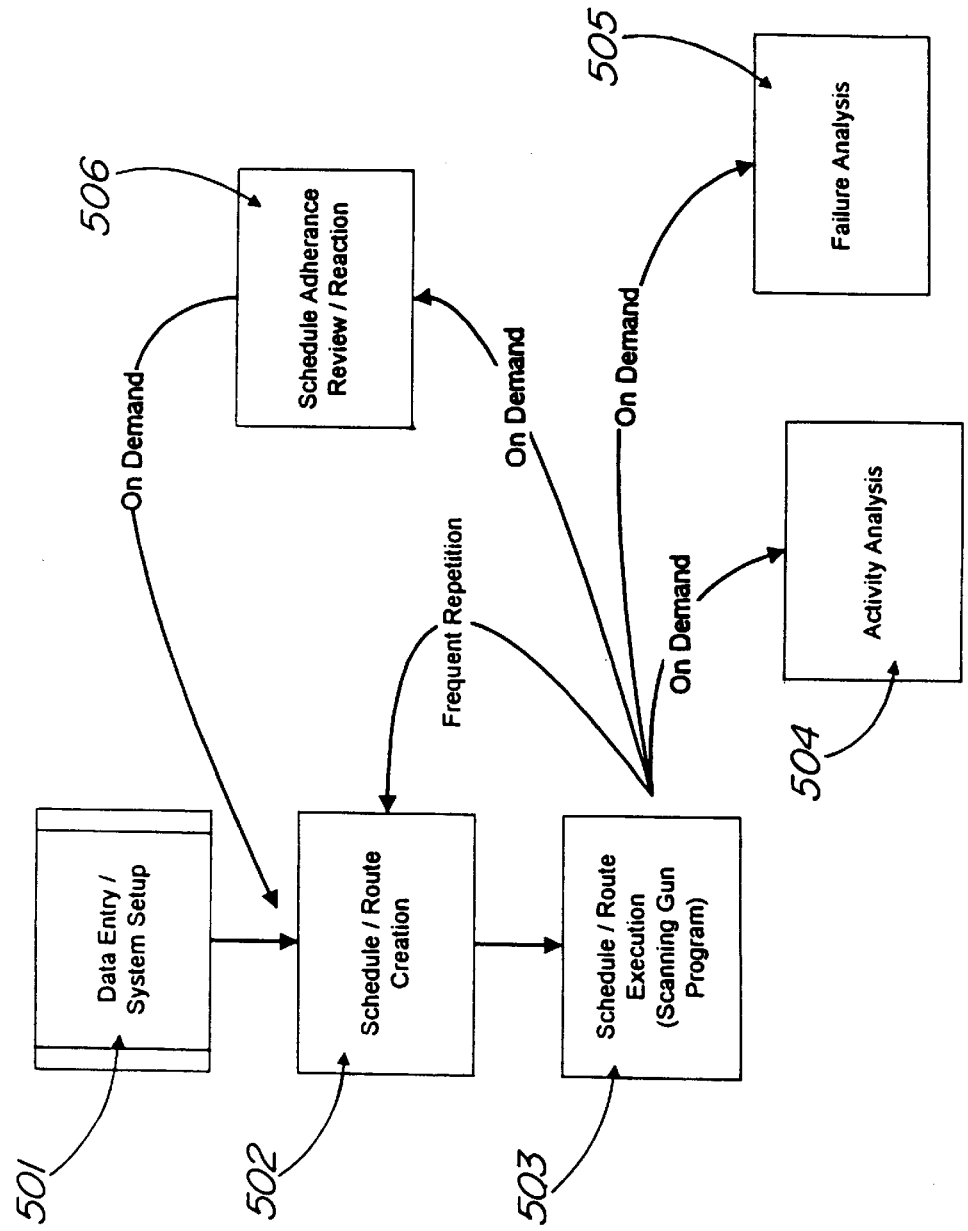
FIG. 6 is a basic overview of overall software usage.

As shown in FIG. 4, the sequence spans three Machines (Machines A,B,C) with example Sections shown in circles. Although Section 301 starts on Machine C, Sections 305 through 315 exist on other machines. This sequencing method is commonly used to efficiently visit all Machines in a Line in one efficient path.

Figure 5:
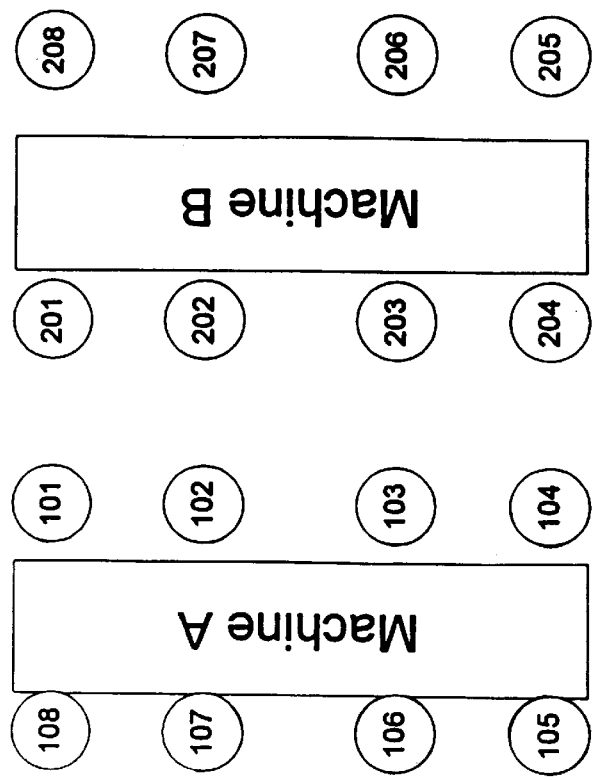
FIG. 5 is another example of section level sequencing of various machinery items.

However, as illustrated in FIG. 5, Section sequencing can also be localized to a particular Machine. In this case Sections are sequentially ordered on each machine. Also, the different machines are further separated and denoted by large increases in the Section numbers. In the figure, all Sections on Machine A have Section numbers in the 100 range while all Sections on Machine B are in the 200 range.

This method of separation is completely optional. As stated, both hierarchical and non-hierarchical methods can be used separately, together or not at all. The above is simply provided as an example of the method used by this invention to organize large numbers of Inspection Points 50 into a meaningful collection.

Continuing with FIG. 7, the Machinery Section module 38 is used to edit and maintain data and contains specific information related to machinery sections 47. The relation of machinery sections 47 to the overall data relationship is illustrated in FIGS. 2, 10 and 11 as described above. Section information is used to describe the location of specific groupings of equipment elements on a specific machine.

The Equipment Data module 39 is used to enter or edit data relative to specific equipment elements 45. This information is used to distinguish the equipment element 45 within a given machinery section 47. Also, this module contain fields to determine the related point types 41 and RCM Questions associated with each equipment element 45.

Figure 14:
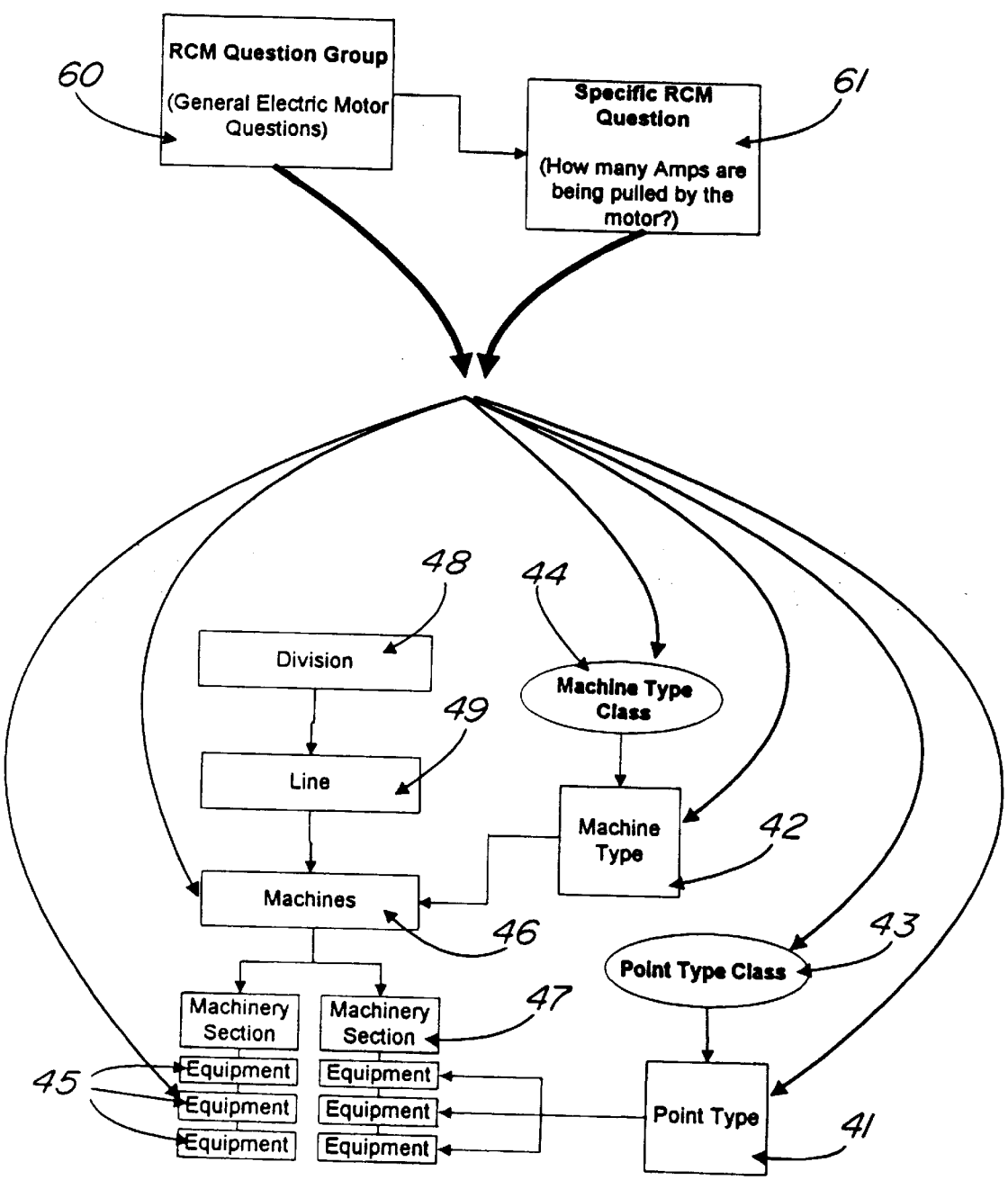
FIG. 14 illustrates relations between RCM Question Groups, Specific RCM Questions and the overall equipment data relationship.

The RCM Question Module 40 is illustrated in FIGS. 9 and 14. FIG. 9 is a flow diagram for data entry to the RCM Question Module. An RCM Question can exist in one of five forms: (1) Action Statements—Perform this task optionally using specific elements. (E.g., change oil using 90 SAE Oil every 90 days, or brush dust off of motor housing.); (2) Quantitative Question—Take a definitive reading or measurement at a specific element. (E.g., how hot is the bearing housing on machinery element 45?); (3) Qualitative Question—answer a question in a manner where definitive quantitative measurements are either not needed or not possible. (E.g., describe the condition of the paint on the stairway on a scale from 0–9, 9 being best.); (4) Yes/No Question—answer a question with a yes or no answer. (E.g., is the exhaust fan running?); (5) Preset Answer List—a short list of possible responses. (E.g., examine the pipe. A. Pipe Needs Replacing, B. Pipe Needs Cleaning, C. Pipe in Good Condition, etc.)

In unison with every question, an expected answer is also given when the question is created. When an inspection occurs and the data is either transmitted or uploaded to the basestation 10 and a question contains an answer that was not expected, the specific equipment element 45 corresponding to the non-normal value is flagged for further attention.

On Quantitative measurements a percentage change element can be enacted along with expected minimum and maximum operating limits. (E.g., a given gearbox is expected to be between 100 and 120 degrees. On an inspection route a temperature value of 150 degrees is recorded. The equipment element will be flagged for further inspection. Also, if many inspections occur over time on the same gearbox with temperature readings of 100, 105, 110, 115 degrees, etc., these steadily climbing values will cause the gearbox to be flagged for additional inspections despite all temperature readings being in the acceptable operating range.)

As shown in FIG. 14, RCM Questions are grouped in RCM Question Groups 60. An RCM Question Group 60 contain many questions 61 which are related in some fashion. For example, an RCM Question Group 60 may contain questions 61 specific for electric motors over 150 horsepower.

RCM Questions 61 are executed in many different methods. As shown in FIG. 14, entire RCM Question Groups 60 can be assigned to either all equipment elements 45 on a Machine 46, all Machines 46 in a Machine Type 42, all Machines 46 in a Machine Type Class 44, all equipment 45 in a Point Type 41 or all equipment 45 in a Point Type Class 43. In addition, specific RCM Questions 61 from within an RCM Question Group 60 can be assigned to the same above elements.

After the proper organization system (if any) is chosen, specific information relative to the particular Section 47 and Inspection Points 50 is entered as described above. For each Section 47, data is collected relative to the hierarchical groupings (if any), non-hierarchical groupings (if any), machinery section 47 description, detailed description describing how to locate the section 47, and any additional information relative to the height of the identifying element 13 or tag identifying each inspection point 50 to particular body parts: head, chest, knee, etc. The fields of information are not limited to the above described list. The list can contain any number of fields of information specific to a particular site.

As described above, each Section 47 contains Inspection Points 50. For each Inspection Point 50, data is collected relative to the Section 47 to which the Inspection Point 50 is related, the classification type of the Inspection Point 50, any substance or item (e.g. lubricants, air filters) which are intended for application at the specific Inspection Point 50, a short description distinguishing the Inspection Points 50 of the same classification which may be contained in the same Section 47. (E.g., Gearbox-Left, Gearbox-Right.) The "-left" and "-right" description distinguish the two Inspection Points of the like classification of gearbox. In addition, a detailed description relative to how to locate a specific Inspection Point 50, and a detailed description for each Inspection Point 50 is also given. Also, the criticality of the Inspection Point 50 is defined along with the time frequency with which inspections or activities should take place for each Inspection Point 50. Finally, questions or data entry prompts intended to be displayed to the end user at the point of inspection can also be entered for each Inspection Point 50.

The number of fields and data related to each Inspection Point 50 can be changed to adequately meet the needs of a particular site. The fields described above are presented as an example of Inspection Points in a large manufacturing facility.

Following data entry, route selection and scheduling may be performed. As illustrated in FIG. 15, a Dynamic Route definition 701 is comprised of five major components: a machinery domain 702, specified inspection filters 703, selection criteria settings 704, user designations and assignments 705 and specified RCM Questions.

The machinery domain 702 is a list of machinery which will be included in the inspection route. The selected equipment is equipment from which the system may "pick from" to create an inspection route. The equipment is presented in the hierarchical or non-hierarchical format. For example, a user may choose all equipment in a given Division, Line, Machine or Section. Additionally, a user may include a set list of non-hierarchical organization points to include the domain from which an inspection route is created.

The Filter settings 703 narrow the inspection route to the desired types of machines and equipment to be inspected. A particular Machine Type or Point Type could be chosen at this location. Users could then create an inspection route containing only the designated Machine Type Class(es), Machine Type(s), Point Type Class(es), and Point Type(s).

Selection Criteria component 704 further determines inspection route creation based upon user supplied information. The route type designation determines which type of RCM questions and tasks to include in the inspection route. If the user picks "Daily Route," only RCM questions and tasks which can be performed while the machinery is running will be scheduled. If the user picks "Downday Route," only RCM questions and tasks which can be performed while the machinery is not running will be scheduled. If the users pick "Both (Anytime)," all relative and pertinent RCM questions and tasks are scheduled.

Furthermore in Selection Criteria component 704, the user may designate a set number of RCM questions and tasks to perform. if this option is chosen, the system will determine a ranked list of RCM questions and tasks further ranked with/without (user preference) consideration of the related equipment criticality.

Also in Selection criteria component 704, all calculation rules relative the RCM question and task due dates are designated. A user may select to include only RCM questions and tasks which are currently due for inspection, all RCM questions and tasks regardless of due date, or all RCM questions and tasks currently due plus any additional RCM questions and tasks coming due within a specified number of days. This selection criteria is supplied in addition to the previously described Selection Criteria 704 settings, Filter 703 settings and Machinery Domain 702 settings.

The final component of Selection Criteria 704 settings is the users ability to "duplicate" scheduled RCM questions or tasks. In most cases users would not choose to duplicate scheduled RCM questions or tasks. (If a certain RCM item was scheduled for a gearbox, the system will insure the item is not duplicated—that is the RCM question or task is not double or triple scheduled among many users.) However, in special situations, a supervisor or manager may wish to allow duplication to insure all RCM tasks are included in an inspection route for review and auditing purposes.

The Users component 705 is used to designate and determine what security level or skill level is required to perform the thus far defined inspection route. If inspections which require great skill are included in the inspection route, the route may be restricted to only senior qualified inspectors. Additionally, a specific list of users may alternately be defined if only a few users are authorized to perform the route.

Finally, the RCM question and task component 706 is used to select items for the inspection route. Users may choose a certain RCM Class such as "Electrical," "Safety," "Lubrication," etc. The system will use these settings to further narrow the list of RCM questions and tasks to include in the inspection route in addition to the previously defined items described in components 702, 703, 704 and 705. Additionally, users may add a Global RCM question or task. Such an item will be listed on all equipment within the selected inspection route as defined in components 702, 703, 704, 705 and 706.

Components comprising an Inspection Route Point Group Definition 710 is illustrated in FIG. 16. Inspection Routes created from an Inspection Point Group Definition is comprised by the machinery domain component 711. This is simply a list Equipment as defined in the hierarchical and non-hierarchical organization methods. This list can contain any number of defined Equipment items. Operation of the RCM Question module 712 is identical to the operation of module 706 in the previously described creation of a Dynamic Route Definition, illustrated in FIG. 15.

The Equipment List component 711 and the RCM Questions component 712 work in unison to provide a set list of items which are inspected in a consistent manner. This type of route definition is used to inspect a very specific group of items; e.g., all widget tiers in all divisions. No ranking, filtering, or consideration to machinery operating conditions is given to this type of route definition.

The Users component 713 is the last element which comprises the Inspection Point Group route definition. The operation of this module is identical to the previously described User module 705 illustrated in FIG. 15.

Figure 17:
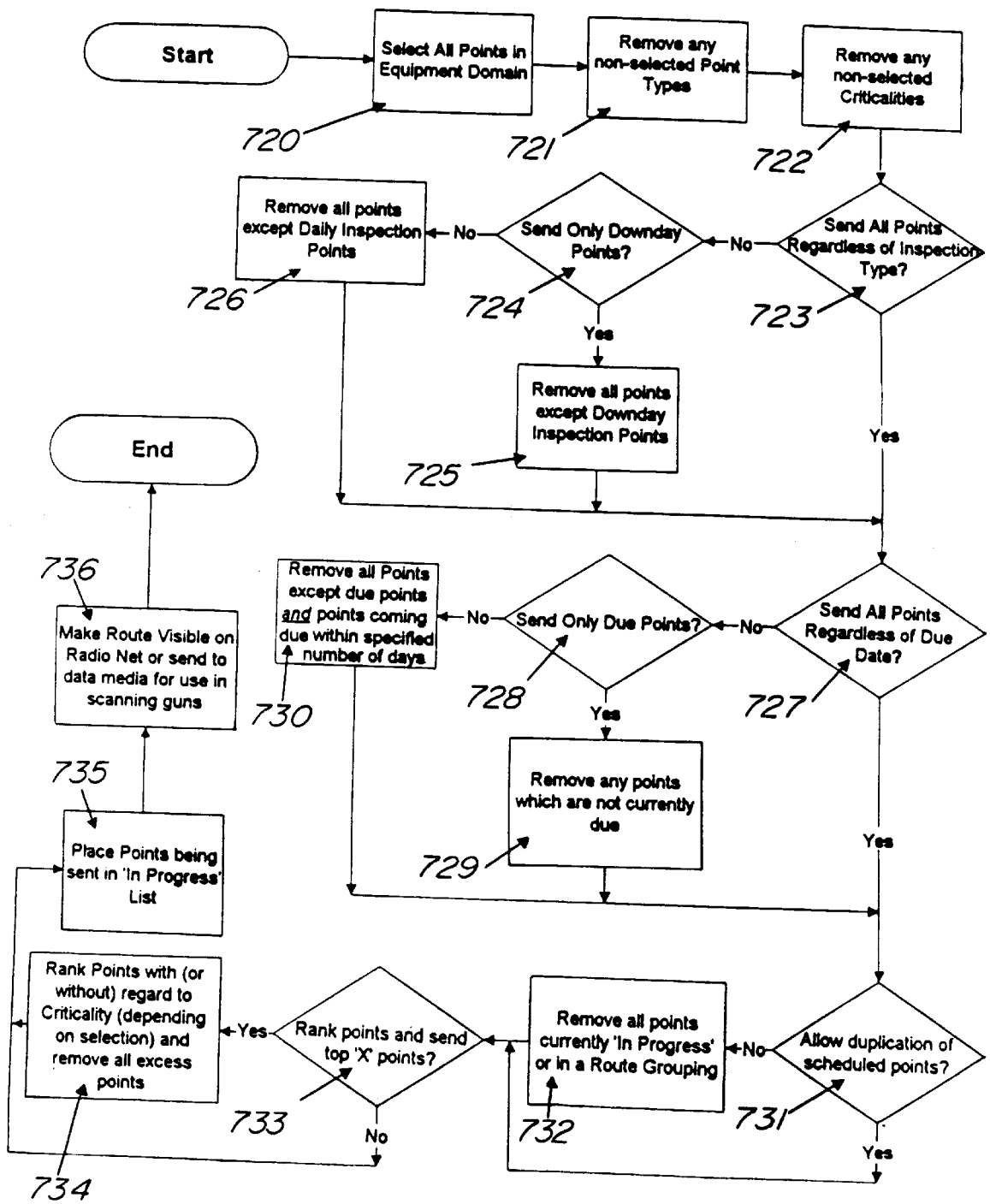
FIG. 17 illustrates the selection process involved when a Dynamic Route Definition is chosen for execution.

Once a Dynamic Route Definition has been created, the points are selected from the database in the manner illustrated in FIG. 17. First, all points defined in the Equipment Domain are selected as shown in step 720. Then, any non-selected Point Type Classes, Point Types or Equipment Criticality designations are removed from the list as denoted by step 721 and 722. Secondly, the system decides if the route is denoted to be performed regardless of the machinery operation state or if the system should decide whether a daily or downday route is being created (as shown in step 723). If the route has a designation such as "downday" or "daily," then the execution proceeds to step 724 for downday points or step 726 for daily points. If a downday route was selected, all RCM questions which are not denoted as downday points are removed. Otherwise, all RCM questions except those marked for daily route execution are removed as illustrated in step 726.

At program step 727, the system then decides all of the thus far selected points will be sent regardless of the individual RCM question inspection frequencies. If the user chooses to send only due RCM questions, the program execution proceeds to step 728 and 729. At step 729, all RCM questions which are not currently due are removed from the route. If the user chooses to send all due RCM Questions plus those questions coming due within a specified period of time, program execution instead transfers to step 730 and performs the corresponding operation.

Next, at step 731, the system determines if any duplication of RCM inspection questions will be allowed. If duplication is allowed, the system skips step 732. Otherwise, all RCM inspection questions which are currently being inspected are removed from the thus far created inspection list.

At step 733 the system determines if a set number of RCM questions will be sent on the route. If the requests a set number of RCM questions to be included, the system ranks the points based on the previously described formula called "percent overdue" and optionally further ranks the selected points with regard to machinery and equipment criticality with a formula called "critical percent overdue" as illustrated in step 734. The appropriate number of RCM inspection questions are removed from the bottom of the list to achieve the desired number of questions to include on the inspection route.

At this point, all points included on the inspection route are denoted as "in progress" to optionally prevent from duplication of future inspection efforts, as shown in step 735.

Finally, as shown in step 736, the route is made visible on a radio net (for RF based scanning devices) or transferred to a scanning card for non RF based devices.

In FIG. 18, the route execution of RCM questions defined by an Inspection Point Group definition is illustrated. Since an Inspection Point Group definition is simply a list of Equipment items, the burden placed on the system for executing such a route is very limited. The system determines in step 740 the duplication of selected RCM questions. This step is identical to step 731 in FIG. 17. If no duplication is to be allowed, the appropriate duplicated RCM questions are then deleted. Then, the route is made available to users and a list of "in progress" points are created as shown in step 742 and 743. This operation is identical to the operations performed in steps 735 and 736 in FIG. 17.

Once a route has been completed (or while a route is being completed in the case of RF based scanning devices—step 750), the system performs a distinct set of procedures to complete the inspection process as illustrated in FIG. 19. In step 751, the system determines if the inspection has been completed. If so, execution progresses to step 752 at which point a RCM inspection date is determined. This date is determined by taking the current date and adding the appropriate number of days as defined by the frequency setting for the individual RCM question or task.

At step 753, the answers to the specific RCM questions are reviewed, any answers which were not expected are flagged for further attention. Additionally at step 753 flags are recorded based on user entries during route execution. Also, for quantitative RCM questions, certain equipment may be flagged for attention if gathered readings are outside of a defined operating range or the historical change in reading over a set period of time exceeds the allowed rate as shown in optional step 755.

At step 754, the RCM question is removed from the "in progress" list.

At step 756 the system determines if the RCM question or task in question has been marked troubled. Points are marked troubled when users performing the inspection routes either directly mark the RCM question "troubled" or users choose a RCM Negative response as a reason for not completing an RCM question. If the point has been marked troubled, the inspection item is duly marked in the master database for supervisor review as illustrated in step 757.

If at step 758, point has been marked critical, the inspection item is duly marked in the master database for review as illustrated in step 759. A RCM question marked as non-critical denotes the question or task could not be completed or something is wrong with the question description, identification tag, inspection frequency, etc. This flag is used primarily by users to notify the system administrator of system fine-tuning or maintenance which needs to be performed. A non-critical designation does not pertain to the reliability or status of the actual item.

Finally, in step 760, the next RCM inspection question or tasked is retrieved from the scanning gun and the process returns to step 750 for the same process. This process continues until all RCM questions or tasks on a given route are processed.

If needed, the criticality of individual Lines 49 can be defined to provide a weighted measure when scheduling Inspection Points 50. Scheduling of inspections can take place in a time-based or on-demand fashion.

Time based inspections are based on the elapsed time since the last inspection of an Inspection Point 50. If the frequency of inspection is less than the time interval elapsed since the last inspection, the Inspection Point 50 will be added to the schedule. In addition, the system could present a list of points which are at least a certain interval of time overdue. Additionally, the system can take points which are the most severely overdue relative to the defined inspection frequency for the Inspection Point 50. For example, an Inspection Point 50 which is intended for inspection every 7 days and is currently 14 days past the last inspection is more in need of inspection than an Inspection Point which is also 14 days past the last inspection but is scheduled every 30 days. The amount of time overdue relative to the individual inspection frequency is used to determine a weighting defined herein as "percent overdue" to schedule items which are the most in need of inspection scheduling.

Time based inspections can also be further weighted relative to the criticality of the Inspection Point 50, Machine 46 or both. In such a case, the percent overdue value can be weighted to either promote or demote an item in the scheduling priority of inspections.

On-Demand scheduling is used to schedule Inspection Points 50 regardless of whether the Inspection Point 50 is due for inspection. For example, an entire line of machinery is intended for inspection during a scheduled down period. The line is chosen without regard to the individual inspection frequencies or elapsed time since last inspection.

Regardless if time-based or on-demand scheduling is chosen, users have nearly infinite control over the selection criteria for inspections. Users can set the domain (inspection points which will be checked for certain criteria) along with the individual Inspection Point type classification to include in the domain. In addition to these classifications, additional selection criteria such as the maximum number of points desired for a route, a required skill level of end users required to inspect the individual points, which ranking system is desired for selection, and similar criteria can be specified.

For illustration of the level of control allowed, a route could be created which is defined as follows: All gearboxes, automatic lubricators, and harmonic drives on Widget Lines 1,2,6,4 and Super Widget Lines 3 and 4 which include points accessible while the machinery is running and the maximum skill level required for adequate inspection is "senior inspector" ranked by percent past inspection date further weighted by criticality rankings such as Equipment and Line importance and profitability.

Once the desired route has been created, the route is presented to the users who will perform the route. (This may be done using the data card 12 or by making the route "visible" on a display using an RF network or data transmission network.) Directions to each inspection point 50 may be provided to the user along with instructions for activities and tasks relative to each inspection point(s) on the optimized schedule. This may be achieved through the use of the portable device 11. In the preferred embodiment, the portable device 11 is a hand held unit with data processing capabilities, the capability of reading from and writing to a data card such as a PCMCIA card, manual input such as a keypad, a display, and an integrated laser scanner particularly adapted for bar code scanning. The location of a particular inspection point 50 and confirmation that the proper inspection point 50 is located is provided by the identifying element 13 located at each inspection point 50. The user performs specific actions as directed by the portable device 11 and records activities or information by using the device 11 to read or deduce a unique code, such as a bar code, from the identifying element 13, which may be a bar coded tag, attached at or near the inspection point. (In an alternative embodiment, the Global Positioning System, GPS, could also be utilized to uniquely identify specific locations via satellite signals and triangulation performed by the portable device. This alternate method is viable when only the location of specific inspection points are important, but the item in the location can be changed. The goal is to make sure that whatever item is occupying a certain location is properly inspected and documented.) Information gathered or transmitted by or from the portable device 11 is used for archival purposes to determine information such as past inspection histories, schedule adherence based on predetermined ideal inspection frequencies, trends based on readings gathered at each inspection point, future inspection routes based on which points were inspected and activity analysis of specific users based on data gathered using the devices or any other method of activity documentation. The portable device 11 may, for example, accumulate data for transfer by PCMCIA card to another data processor or could transfer data by other means such as radio frequency (RF) transmission.

Figure 21:
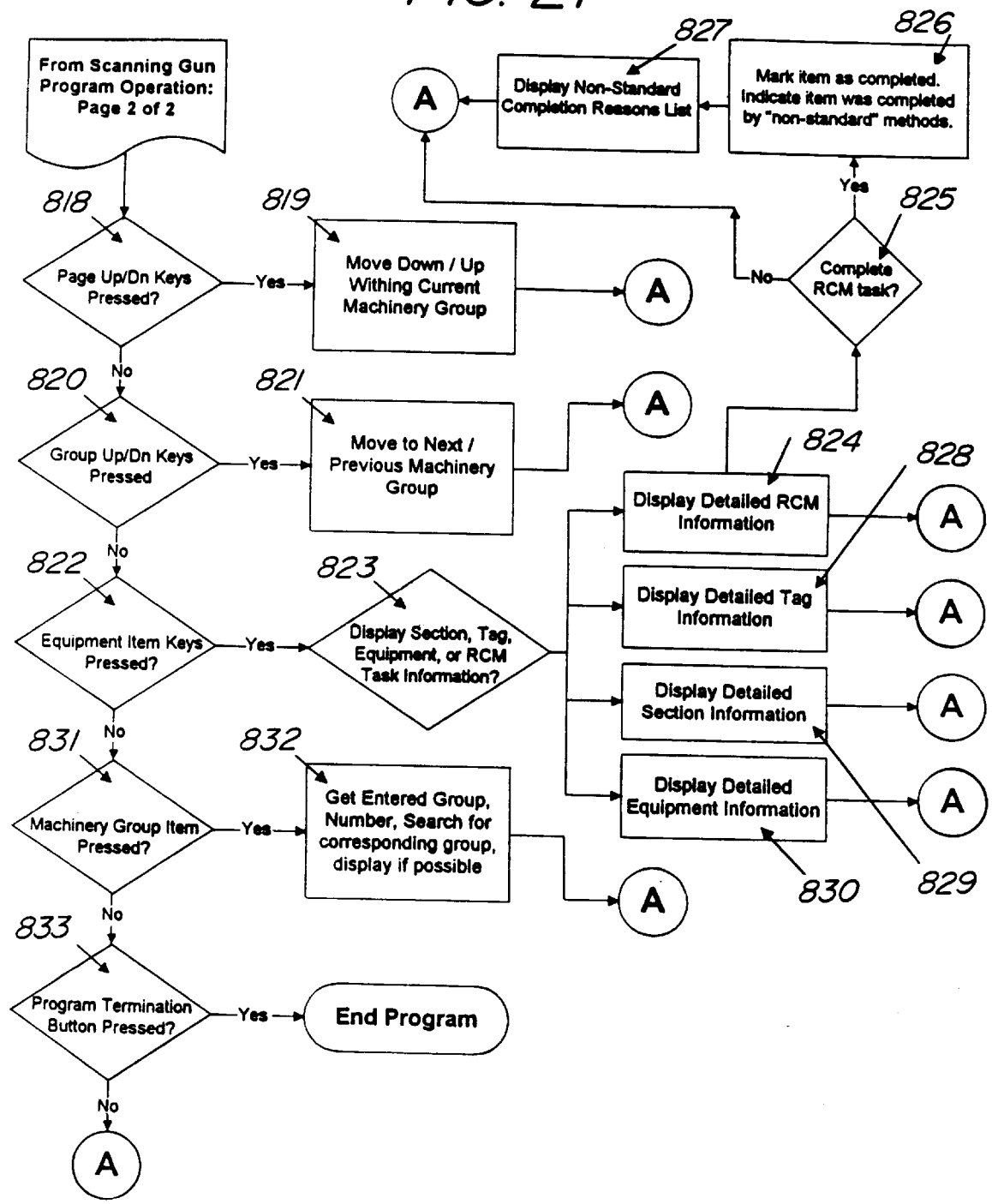
FIG. 21 is the second of two illustrations describing the operation of the scanning gun software.

In a preferred embodiment, the element uniquely identifying a particular inspection point 50 would be a bar-code. However, any means whether electronic or other could be used as long as a method exists for the item to provide a machine readable image or signal, electronic or other, readable by the portable device. In this embodiment, the bar code is read by a laser scanning element incorporated in the portable device 11. Software for operating the scanning gun embodiment of the portable device 11 is described with reference to FIGS. 20–21.

FIG. 20 illustrates the method of operation of scanning device 11. At program step 801, the scanning device provides a user a list of items requiring a RCM question or task execution.

While this "to-do" list is displayed on the scanning gun screen 20, the system waits for user input at program location 802. The user may respond in one of two ways: by scanning/reading an identification element 13 using the laser emitting portion of the device 21 or by pressing keys on the scanning device keypad 22.

If an identification element 13 is scanned, the system determines if the scanned portion corresponds to a Section 47 of Equipment 45 at program location 804 and 805, respectfully. If the system deduces the scanned item corresponds to a Section 47, the scanning gun program proceeds to program location 809 and queries an internal list of all valid Sections 47 available to the user and determines if the scanned Section 47 is valid. If the scanned Section 47 is valid, the system progresses to program location 810 and displays all RCM tasks or questions relative to the scanned Section 47 on the scanning gun screen 20. Program execution then returns to program locations 801 and 802.

If the scanned Section 47 was not valid, meaning the scanned Section 47 did not contain any equipment 45 elements scheduled for RCM tasks or questioning, the system progresses to RCM location 807 and allows the user to "flag" the Section 47 as needing further attention in addition to entering a small description of the problem using the scanning device keypad 22. Such "flagging" occurs at program location 808. Either after the section 47 has been "flagged" or after the user chooses not to flag the element, program execution then returns to program locations 801 and 802 and awaits user input.

If the scanned element is determined to be an equipment 45 element at program location 806, then program execution proceeds to location 811. At program location 811, a complete detailed description for equipment element 45 is displayed along with the RCM questions and task to be performed relative to equipment element 45.

At program location 812, the user may choose which RCM task to first complete. However, the system may require certain RCM tasks and questions or groups of RCM tasks and questions to be performed in a defined order. This order is defined by the user in the basestation software program.

If the chosen RCM task can be performed at the time the user presses the corresponding key 22 on the scanning device, program execution proceeds to program location 813. Depending on the type of question being asked the user may respond to the displayed RCM question or task in one of five ways. First, if the RCM question is a "Command" RCM question type, then user simply denotes task completion with a simple confirmation. Second, in the case of "Quantitative" RCM questions, the user must enter a value, such as "35.16," to complete the task. Third, in the case of "Qualitative" RCM questions, the user must respond in a range such as entering a value from 1 to 10, A to Z, red to black, etc. Fourth, if a "Yes/No" RCM question task is entered, the user responds with a "yes" or "no" answer. Fifth, if a "Preset List" RCM question is entered, the user responds by pressing the appropriate keystroke 22 on the scanning device corresponding to preset question responses. (E.g., if the RCM prompt on the scanning gun screen 20 displayed "Examine the Pipe and respond," the user may respond with a keystroke: "A-Pipe needs painting; B-Pipe in need of repair within 60 days; C-Pipe in need of immediate repair; D-Pipe in good condition.")

Once the RCM task or question has been completed, program execution proceeds to location 814. At this point, the program flags the particular RCM task or question as complete and removes the entry from the scanning gun display 20. Program execution returns to program location 811 until all RCM tasks or questions are completed for the given equipment 45. When all tasks for equipment 45 are completed, program execution returns to locations 801 and 802 and awaits user input.

If the user chooses not to complete the RCM task or question at program location 813, program execution proceeds to location 815. At program location 815, the user is presented with a list of preset "RCM Negative Responses." These responses provide the user a method by which to quickly record why a particular inspection was not performed. (E.g., similarly to a "preset list" RCM question, the user is presented with a list of responses on the scanning device screen 20. The user chooses a response by pressing a corresponding key on the scanning device keypad 22. The list may be similar to the following example: "A. Machine running, could not inspect; B. Grease fitting damaged, could not lubricate; C. Could not find equipment; etc.")

After the user enters a RCM negative response at program location 815, program execution proceeds to program location 816. The user is then asked if the scanned equipment 45 should be marked as "troubled." If the user chooses to mark the equipment 45 "troubled," the system requests a "troubled inspection frequency." This inspection frequency supersedes all other inspection frequencies. (That is, if the user enters a troubled inspection frequency of 3 days, the specific equipment 45 will be scheduled for inspection every 3 days regardless of the RCM task or equipment inspection frequency. The "troubled inspection frequency" is used to insure equipment which is noticeably not operating within usual parameters is given intense attention.) Once the user enters the desired "troubled inspection frequency," the value is recorded at program location 817. As described earlier, program execution either proceeds to location 811 if more RCM tasks or questions correspond the given equipment 45. Otherwise, program execution proceeds to locations 801 and 802.

If the user chooses to press keys 20 on the scanning device 11 at program location 803, program execution proceeds to location 818. At this location, the program decides if the keys corresponding to "page up" or "page down" were pressed. (Such navigation keys are needed due to the limited amount of information which can be presented on the scanning gun screen 20 at one time.) If such keys are pressed, the program displays the appropriate number of equipment 45 with RCM tasks or questions preceding or following the currently displayed set of equipment 45 with RCM tasks or questions. This operation is illustrated as program step 819. After this operation has taken place, program execution returns to locations 801 and 802 and awaits further user input.

If the user chooses to press keys 20 on the scanning device 11 which correspond to "group up" or "group down" navigation keys, program execution proceeds to location 820. If such keys were pressed, the program will either move to the previous or next group containing information. In the scanning gun program, a "group" is all equipment 45 and RCM tasks and questions contained on a given machine 46 within a line 49. This feature allows the user to navigate through a large number of RCM tasks and questions by moving an entire group (containing possibly hundred of RCM tasks and questions) with a single keypress. The operation is illustrated as program step 821. After this operation has taken place, program execution returns to locations 801 and 802 and awaits further user input.

If the user chooses to press keys 22 corresponding to displayed equipment 45 on the scanning device 11, program execution moves to location 822. If such keys were pressed, the program presents users with a simple menu of detailed information which can display on the scanning device screen 20. The menu choices include: 1) RCM question and task information, 2) Tag information, 3) section information, 4) equipment information. At program location 823, the program determines which type of information to display.

If RCM task information is chosen for display, program execution proceeds to location 824. At this location, users are presented a list of RCM tasks and questions which are to be completed. The RCM tasks are relative to equipment 45 which was displayed on the scanning gun display 20 at the time of the keypress. (This displayed list of RCM tasks and questions is very similar to the list presented at program location 811.) The user presses a key 22 on the scanning device corresponding to the RCM task or question which is intended to be completed. The system asks the user to confirm that the RCM task or question will be completed at program location 825 in the same manner by which RCM tasks and question completion was described for program location 813. If the user confirms the task will be completed, program execution proceeds to step 826. At this location, the RCM task or question is marked completed; however, the program also flags the completed task or question as being completed in a "non-standard" method. This is due to the fact the user completed the task without scanning the corresponding identification element 13. At this point, program execution proceeds to program location 827. The system then presents the user a list of reasons why the completed task or question was performed in a non-standard method. (E.g., the user is presented a list of predefined answers. Answers are chosen by pressing the corresponding key 22 on the scanning device 11: "A. Tag damaged, would not scan; B. Tag missing; C. Forgot to scan when near equipment; D. Tag is unsafe area; etc.") At this point program execution returns to locations 801 and 802 and awaits further user input. Also, if the user chooses not to complete the RCM task or question at program location 825, program execution will return to locations 801 and 802 and await user input.

If tag information is chosen for display, program execution proceeds to location 828. At this location, users are presented with detailed information relative to the placement, location, and attachment element of the identification element 13. Once this information is displayed, the program returns to locations 801 and 802 and awaits user input.

If section information is chosen for display, program execution proceeds to location 829. At this location, users are presented with detailed information relative to the section 47 descriptions of a particular machine 46. This information aids new or inexperienced users find the appropriate equipment 45 indented for inspection. Once this information is displayed, the program returns to locations 801 and 802 and awaits user input.

If equipment information is chosen for display, program execution proceeds to location 830. At this location, users are presented with detailed information relative to particular equipment items 45. Such information would include inspection frequencies, the last person to perform an inspection on the given, which RCM tasks where performed, the proper product and quantities to use on the particular equipment 45, etc. Once this information is displayed, the program returns to locations 801 and 802 and awaits user input.

If the user chooses to press keys 22 on the scanning device 11 which requests a specific machinery group to be displayed, program execution proceeds to location 833. If such keys were pressed, the program will ask the user to enter the "Group ID" of the particular group to be displayed. As previously mentioned, a "group" is all equipment 45 and RCM tasks and questions contained on a given machine 46 within a line 49. Each group is assigned a unique number. Once a user enters a "Group ID," the program execution proceeds to location 832 and searches the route currently being executed to see if scheduled tasks exist for the requested group. If such tasks exist, the program displays the associated equipment 45 and RCM tasks or questions on the scanning device screen 20. After this operation has taken place, program execution returns to locations 801 and 802 and awaits further user input.

The scanning gun embodiment 11 is illustrated in FIG. 22. The scanning gun contains three basic components which are used to accomplish the task of the invention described herein. The laser emitting and reading unit 22 emits and reads illuminated bar-code items. This component may also be used to read radio-frequency identification buttons. In this scan component 22 must simply get within a few inches of an identification tag. The component 22 emits a signal which is detected by the identification tag. The tag in return emits a uniquely encoded signal which is detected and decoded by component 22. Component 20 is similar to a small computer monitor. This is the part of the gun with which the user reads and responds to system prompts. The RCM questions and tasks, equipment descriptions, product information, etc., is displayed on component 20. Finally the user enters responses to RCM questions and tasks with the scanning gun keyboard 22.

Also, as described above a transmitted signal from the GPS, Loran or other yet undeveloped navigational or geographical location systems could be used to triangulate a very specific location and therefore uniquely identify a specific location eliminating the need for any tag or other identifier at the individual inspection locations.

The GPS, Loran or other system could also direct workers to specific asset locations via the aforementioned triangulation by the portable devices. This triangulation could be integrated with site maps or CAD drawings on the portable device to provide a moving map of a facility with items requiring inspection highlighted on the map.

Additionally, in a preferred embodiment, the portable device would contain a human readable display. Although the invention is not limited to this embodiment, the display would provide users the means to obtain additional information relative to a specific inspection point or group of inspection points or allow for directing users to perform specific activities or gather specific data at the uniquely defined and identified inspection points. Alternatively, the display could be used to display a photograph or diagram of the particular item of equipment to be inspected.

Workers use the directions provided by the optional portable devices 11 to locate the individual inspection points 50. Once the individual inspection points 50 have been located, the workers can perform many functions. Individual questions relative to each inspection point 50 can be asked, answered and documented. Inspection tasks for the individual inspection point items can be marked and documented as complete. The users may "flag" specific items as in need of further intention.

Also, users can initiate special inspection modes for specific items denoted as abnormal. These special inspection modes supersede all normal inspection frequency criteria and weighting to insure the item receives intense attention. This intense attention continues until the item's abnormal flag is removed. At such time, the item would return to normal scheduling and weighting parameters.

The data collected by the user from the portable device 11 and stored on a data card 12 is downloaded to a central computer system; i.e., the basestation 10 for updating the database 14 or through a networked communication method to a separate storage location containing the archived data. The basestation 10 may perform the scheduling and routing tasks in addition to maintaining the archived database 14. Also, as discussed above, the basestation 10 may be used to provide analyses of the data in the archived database 14 and generate reports.

Integration of this invention with existing planning systems could allow for individuals to flag points on the plant floor as "in need of further attention." This flagging could be instantly transmitted via an RF system or other method to a central location. This central location could route the request to the proper person or group for immediate attention. (A work order could instantly appear or be printed in the appropriate maintenance shop.)

Inventory analysis of items required for inspection can also be maintained by the invention. For example, the invention can monitor and automatically reorder lubricants, filters, paint, or the like for activities related to the system.

Coordination with usage input on the portable devices 11 in the field allow for automatic inventory reduction. Also, the invention can prompt users to take specific samples (such as oil samples). These oil samples can be placed in containers with machine readable elements such as, but not limited to, bar-codes. The users could use portable devices 11 to record the specific Inspection Points 50 from which the sample was taken and also the container into which the sample was stored.

The invention in turn would allow these samples to be sent to an internal or external testing facility. When the test results are returned, users simply enter the container number of the sample tested to instantly view from which Line 49, Machine 46, Section 47, Inspection Point 50, etc., the sample was taken. Additionally, this information would be documented in the database 14 and provided on a on-demand fashion for interested persons.

Once the samples were reviewed, users could instantly promote or demote the specific locations from which the samples were taken for immediate inspection by the aforementioned process facilitated by this invention.

The structure of the system has been created to allow for pictures or drawings to be related and stored relative to any Inspection Point 50, Section 47, Machine 46 or Line 49 in the database 14. For example, users could take CAD drawings or digital pictures of specific items and store these items in the database 14. These pictures could be used on-demand by workers on the shop-floor to reference specific location conditions or to simply locate individual items.

Additionally, digital pictures could be captured as a part of the inspection process and related to specific Inspection Points 50 as part of the documented inspection process. Users could then review from one location the visible images of individual Inspection Points 50.

In the same manner, non-standard images such as infrared images or x-ray images could be prompted to be stored on, or transmitted by, the portable devices 11 and related to specific Inspection Points 50 at the basestation 10.

Analysis of any of the aforementioned gathered data is available in many forms. Adherence to inspection schedules, analysis to specific questions relative to each points, activities of specific workers, attention given to a specific machinery, forecasted inspection load, predicted failures based on gathered readings, or the like.

In addition, this information could be presented in any form such as, but not limited to, printed reports, displays on monitors, displays on the portable devices, automatically generated electronic mail, telephony (fax on demand) transmission of reports based on user input, or the like.

In an alternative embodiment of the present invention, a radio frequency (RF) transmission system could be utilized for real-time updates of inspection efforts. RF data transmission could also be utilized by the invention to coordinate large groups of individuals working on multiple pieces of machinery.

For example, a large paper machine might have six workers assigned for inspection tasks. Instead of providing each worker a rigid set of items for inspection, all workers can "pick and choose" from a common list of items on the machine requiring inspection. Therefore, as soon as an item is completed, the data is transmitted to a central data location and the item in turn is removed from the list and no longer visible to the other workers on the machine. This allows for a very flexible method of operation while insuring work is not duplicated.

A combination of the RF transmission capabilities linked with the GPS, Loran or other systems allow for any individual at any location, remote or otherwise, to view real-time activity completion and the actual movements of workers performing the inspections.

EXAMPLE

The following section is provided as an example installation illustration for a lubrication oriented application:

Installation

Initially, an advance team is sent to the site to start in-depth planning of an installation. This planning is achieved primarily by taking existing lubrication surveys (which are commonly prepared by outside consulting firms or large oil companies) and comparing the lubricant and applications frequencies suggested to what the workers are actually following.

If discrepancies exist between the site as normal operating procedure and what the consulting firms or manufacturers have suggested, it is necessary to foster agreement and document the consensus. This consensus will serve as a general blue print for installation. This consensus document defines which oils and frequencies are required and will assign bar-code tags during installation.

The advance team will also start training and discussions with the actual end users of the system. These discussions build understanding in the system and process before installation starts. Through understanding, the end users will adopt the system and use it as a tool.

When an installation guideline manual has been completed and signed by all members involved at the site, a firm installation date is planned. This is the date when crews actually arrive at the site and start installation of the system.

The most demanding task of effectively installing the system is determining how to organize the machinery in a coherent fashion to allow for effective execution of lubrication routes. Machinery is optionally organized in order of increasing specificity for large installation sites; e.g., the following terms may be used: Division, Lines, Machines, Sections and Equipment. (Depending on the facility's needs and desires, information may also be grouped into non-hierarchical groupings.)

For example, a large automobile factory could have two divisions: one division which produces cars and one that produces trucks. Inside the car Division, the different machinery devoted to making a specific model of car would be defined as a Line. Each station or group of tools or machines along the line which performs a specific function in the manufacturing process of the car would be defined as a Machine. In turn, each Machine would be split into Sections which allow for grouping of assets requiring lubrication or inspection into small manageable groups. Each of the individual items grouped into the Sections are defined as Equipment.

Additionally, one may sequentially organize the Sections on each Machine to allow individuals to efficiently visit all Sections in one continuous flow. This sequencing of Sections is a tricky task to efficiently execute.

Normally, Section sequencing follows the machinery process or production flow; e.g., start Section 1 at the end of the machine which receives raw product and commence Section numbering at the discharge end of the machinery. However, in some cases the machinery size or location does not allow for section numbering to take place in this fashion. Also, since we are using the term Machine simply as a organization term, a "Machine" in terms of this invention may only be a small part of a much larger physical machine.

Nevertheless, the overriding goal is to divide the Machines into sequenced Sections to allow for an individual to visit all needed areas of an asset which require preventive maintenance attention in the most efficient path possible.

Each Section is entered into a computer system. For each Section record: a physical text description telling individuals how to get to the Section, which direction the tag at the section is facing (North, South, East, West), any facility specific organization schemes identifiers, a short description of the machine section (Winder-Operator Side), how high each tag is relative to an average sized individual (Low, High, Waist, Knee, Chest, Head), and to which specific Division, Line, and Machine the Section belongs.

After the section sequence has been determined, specifically identify the various Equipment within each Section which requires preventive maintenance attention. The equipment may be gearboxes, grease fittings, auto lubricators, harmonic drives, gears, or the like.

Preferably the invention allows up to four Equipment items for each Section. This limit of four Equipment items per Section is primarily to allow for a uniform tag size. If another tagging method is used, there is no limit to the number of items per Section. Additionally, the limit of four items at each Section is an ergonomic consideration for the end user. If the system prompts a user to visit a certain Section, he can quickly identify one of the four items on the tag and perform the work instead of spending considerable time trying to find the appropriate tag.

At this point each Equipment item is entered into database 14. For each equipment item, record to which Section it belongs (thus relating the equipment to a specific Division, Line, and Machine), the Point Type 41 of each equipment (Gearbox, Air Oiler, Grease Point, Hydraulic Motor, etc . . . ), a very short additional description which appears on the tags if the Section contains two or more Equipment items of the same type; e.g., if two gearboxes are on the same tag, differentiate between the two on the tag level. One gearbox might appear as "Gearbox-Right" and the other as "Gearbox-Left." The "-Left" and "-Right" description is the additional printed description.), a complete text description for the Equipment item (Gearbox under wide belt conveyor from log saw, low inside safety guard near blue electrical panel), the lubricant or item each Equipment item requires, the frequency for which the Equipment item requires inspection, and the Inspection Type for the equipment item. (The invention provides for three inspection types: Daily, Downday, Both/Anytime. A Daily Inspection Type would indicate the Equipment item can only be inspected while the machine is running. A Downday Inspection Type would indicate the Equipment can only be inspected during machinery downtime due to the nature of the equipment or safety considerations, a Both/Anytime designation would indicate the machinery can be inspected regardless of whether the machine is running or not.

This process of identification is performed on the production floor utilizing laptop computers. Additionally, as stated above, it is desirable to work closely with the facility's mechanics to insure the terms used in the descriptions of Sections and Equipment are understandable. It is also desirable to utilize existing lubrication surveys and manufacturer's specification to insure that inspection frequencies and lubrication types are accurate for each individual piece of machinery.

Once the information for a machine or complete line is entered into laptop computers, print an Asset Report which specifies all descriptions for Division, Lines, Machines, Sections and Equipment. Next, review this report with the user to insure that the items are described correctly and have assigned the correct lubricants and inspection frequencies to the individual items. Also, walk through the machinery with the customer to insure that no assets have been missed.

If the user approves of the Asset Report, print the individual bar-code tags for the machinery, return to the machinery and attach the tags. (Desirably, the tags are heavily laminated plastic tags attached using pop rivets or wire ties.) After the tags are attached to the machines, installation is complete.

System Usage

The system uses the information captured using the process above to schedule each individual Equipment item separately. Therefore, an entire physical machine at a site might have 1500 individual equipment items identified but only have 15 which need preventive maintenance attention. The present invention guides the users to the 15 items using the Division, Line, Machine, Section and Equipment information described above. The other 1485 are ignored. The invention only focuses on the items due for attention.

The user would start the day by going to the BaseStation 10. The Basestation may be simply a personal computer with the software and needed hardware described above. The user inserts a PCMCIA data card into the basestation and specifies which type of route he wishes to perform: Downday, Daily, Both. The user further indicates the machinery he wishes to visit. Also, all point types are chosen (gearboxes, air oilers, gears) or a specific point type may be chosen (Take me only to the gearboxes). The user further tells the system either: 1) visit all points meeting my specifications regardless if they are due for inspection or not, 2) visit all points due for inspection, or 3) visit only the top X points most in need of inspection.

If the user picks the top X points, the invention uses a calculation called Percent Overdue. This calculation is simply (number of days since last inspection/Normal Inspection Frequency). This gives a relative weighting as to the overdue severity of each item. (If an item should be inspected every 3 days and it has been 6 days since the last inspection, the item is 100% overdue. Another item may be 3 days overdue but its normal inspection frequency is once every 365 days. Therefore it is only 0.008% overdue. The first item should be inspected first. Additionally, business rule factors such as machine line profitability and relative importance of machinery part classifications are used to further organize and rank items in the route inspection list.

This method of calculation is the most logical way to perform inspections; however until now there has not been a system to accurately derive the numerator in the calculation, number of days since last inspected. A system such as the invention herein described is required to know this value.

Inspection is achieved using a hand-held scanning device or gun. This device incorporates a laser bar code scanner, a data processing unit, means to accept the input from a PCMCIA card, manual input such as a keyboard, and information output such as a multi-line display. The device prompts the user to visit individual Lines and Machines. Once at the specified Line and Machine, the user is given the Section, Equipment, and Point Type of the asset he is to inspect. For example, the gun might prompt the user to visit Line: #8 Tissue, Machine: Winder. Once at this machine the gun might display 101–4 Gearbox-Right. The "101" is Section 101 of the Winder, the "4" indicates the fourth item on the tag corresponding to Section "104." "Gearbox" would be the point type and "-Right" would be the additional printed description to differentiate from another like item on the same Section. (Verbose descriptions for both the section and equipment are available on the portable device 11 at the user's request.)

Once the user has completed the required lubrication for the specified Equipment point, he would scan the tag corresponding to the equipment. At this point, the gun will display the full text description and required lubricant for the point (e.g., Gearbox-Machine K Oil—Gearbox East side of winder, South end, low near main gear adjustment section). At this point the user is also informed how many days have elapsed since the last inspection for the piece of equipment and the proper inspection frequency (E.g., it has been 141 days since last inspection, it should be inspected every 100 days). The user then presses either "Y" to indicate "Yes-Item Complete" or "T" to flag the point "Troubled."

If the user presses "T", the portable device will further ask if he wishes to flag the item "Non-Critical" or if a "Troubled Inspection Frequency" should be activated. If the user picks the "Non-Critical" item, the Equipment is tagged and no further questions are asked. If the user picks "Troubled Inspection Frequency," the portable device/gun asks him to enter a desired "Troubled Inspection Frequency." This frequency supersedes the normal inspection frequency entered for the Equipment during installation. This frequency is used when a piece of equipment is not operating properly and needs to be inspected at a more frequent rate until the problem is diagnosed or the equipment is running properly again. (E.g., the user notices a gearbox that is very warm to the touch. The gearbox is normally inspected every 30 days. However, the user enters a Troubled Inspection Frequency of 3 days. The system will continuously schedule the point every 3 days until the user is satisfied it is running properly and turn the "Troubled Inspection Frequency" off.)

As the user completes the individual points, items disappear from the display of the gun. The user works from a declining list. He continues work until the gun displays no equipment needing inspection. When this occurs, he returns to the system basestation, removes the data card from the inspection gun and inserts it into the basestation. He logs onto the basestation, enters his password, and the route is uploaded onto the system. At this point, the system reschedules each individual point for a time specified by either the equipment inspection frequency or the troubled inspection frequency. The user may print a report at this time of any points marked Troubled or Non-Critical. At this point the inspection route is completed.

Additionally, users may interrogate the basestation to learn which machines are in most need of inspection, who has been doing the most work, what point types comprises the majority of inspections, what points are X days past due, what points are Y percent past due, when was a specific point last inspected, who inspected the point last, or the like information.

The present invention has been described with reference to certain preferred and alternative embodiments which are intended to be exemplary only and not limiting to the full scope of the invention as set forth in the appended claims.

What is claimed is:

1. A method for identifying, organizing, scheduling, executing, analyzing and documenting detailed inspection activities for specific items of equipment in either a time-based or on-demand fashion, comprising the steps of:

(a) identifying items to be inspected;

(b) scheduling items for inspection utilizing data input by a user or data derived from an archived database of data relative to each item scheduled for inspection and relative to the detailed inspection action performed for each item in the past;

(c) providing directions to geographically locate specific items scheduled for inspection;

(d) providing instructions for detailed inspection actions for each item scheduled for inspection;

(e) geographically locating each item scheduled for inspection and performing detailed inspection actions for each item scheduled for inspection;

(f) gathering data relative to each item scheduled for inspection and relative to the detailed inspection action performed for each item;

(g) confirming the detailed inspection action performed for each item;

(h) storing data relative to each item scheduled for inspection and relative to the detailed inspection action performed for each item in a database;

(i) analyzing data stored in the database relative to each item scheduled for inspection and relative to the detailed inspection action performed for each item; and (j) documenting the detailed inspection action performed for each item.

2. The method of claim 1 comprising the additional step following step (a) of organizing the items identified for inspection.

3. The method of claim 2 wherein the step of organizing the items identified for inspection comprises the step of organizing the items identified for inspection into hierarchical groupings.

4. The method of claim 2 wherein the step of organizing the items identified for inspection comprises the step of organizing the items identified for inspection into non-hierarchical groupings.

5. The method of claim 3 wherein organizing the items identified for inspection into hierarchical groupings comprises the steps of: grouping like items to be inspected into inspection points, grouping inspection points into sections, grouping sections into machines, grouping machines into lines, and grouping lines into divisions.

6. The method of claim 4 wherein organizing the items identified for inspection into non-hierarchical groupings comprises: grouping items in physical proximity into observation points.

7. The method of step 5 wherein organizing the item identified for inspection further comprises classifying the items into type classes.

8. The method of step 6 wherein organizing the item identified for inspection further comprises classifying the items into type classes.

9. The method of claim 7 wherein the scheduling of step (b) is time-based on the elapsed time interval since the last inspection of the specific item.

10. The method of claim 7 wherein the scheduling of step (b) is on-demand of the user based on selection criteria determined by the user without regard to the elapsed time interval since the last inspection of the specific item.

11. The method of claim 9 wherein the time-based scheduling of step (b) is based on a weighting factor which takes into consideration the number of days the inspection of the item is past due compared to the normal inspection frequency.

12. The method of claim 10 wherein the on-demand scheduling of step (b) is based on the maximum number of points desired for a route, a required skill level of end users required to inspect the specific items, and classifications of the items to be inspected.

13. The method of claim 11 wherein the time-based scheduling of step (b) is further based on a weighting factor which takes into consideration designated criticalities for specific items.

14. The method of claim 13 wherein the time-based scheduling of step (b) is further based on a weighting factor which takes into consideration designated criticalities for specific classes of items.

15. The method of claim 14 wherein step (c) comprises downloading directions for locating items scheduled for inspection from a basestation data processing device to a data card, loading the data card into a portable data processing device having a user readable display, and displaying the directions to items scheduled for inspection to the user.

16. The method of claim 15 wherein step (f) further comprises performing reliability centered maintenance (RCM) comprising the steps of downloading RCM questions regarding items scheduled for inspection from a basestation data processing device to a data card, loading the data card into a portable data processing device having a user readable display and user input means, displaying the RCM questions regarding items scheduled for inspection to the user, and entering data from the user in response to the RCM questions into the portable data processing device by the user input means.

17. The method of claim 16 wherein step (a) further comprises assigning a unique machine readable identifying element to items to be inspected and step (g) comprises scanning the identifying element by machine reading means to confirm the location and the detailed inspection action performed for the item.

18. The method of claim 17 wherein said identifying element comprises a bar coded tag having a unique identifying bar code attached to each item requiring inspection and said machine reading means comprises a portable laser bar code scanner.

19. The method of claim 12 wherein step (c) comprises downloading directions for locating items scheduled for inspection from a basestation data processing device to a data card, loading the data card into a portable data processing device having a user readable display, and displaying the directions to items scheduled for inspection to the user.

20. The method of claim 19 wherein step (f) further comprises performing reliability centered maintenance (RCM) comprising the steps of downloading RCM questions regarding items scheduled for inspection from a basestation data processing device to a data card, loading the data card into a portable data processing device having a user readable display and user input means, displaying the RCM questions regarding items scheduled for inspection to the user, and entering data from the user in response to the RCM questions into the portable data processing device by the user input means.

21. The method of claim 20 wherein step (a) further comprises assigning a unique machine readable identifying element to items to be inspected and step (g) comprises scanning the identifying element by machine reading means to confirm the location and the detailed inspection action performed for the item.

22. The method of claim 21 wherein said identifying element comprises a bar coded tag having a unique identifying bar code attached to each item requiring inspection and said machine reading means comprises a portable laser bar code scanner.

23. The method of claim 8 wherein the scheduling of step (b) is time-based on the elapsed time interval since the last inspection of the specific item.

24. The method of claim 8 wherein the scheduling of step (b) is on-demand of the user based on selection criteria determined by the user without regard to the elapsed time interval since the last inspection of the specific item.

25. The method of claim 23 wherein the time-based scheduling of step (b) is based on a weighting factor which takes into consideration the number of days the inspection of the item is past due compared to the normal inspection frequency.

26. The method of claim 24 wherein the on-demand scheduling of step (b) is based on the maximum number of points desired for a route, a required skill level of end users required to inspect the specific items, and classifications of the items to be inspected.

27. The method of claim 25 wherein the time-based scheduling of step (b) is further based on a weighting factor which takes into consideration designated criticalities for specific items.

28. The method of claim 27 wherein the time-based scheduling of step (b) is further based on a weighting factor which takes into consideration designated criticalities for specific classes of items.

29. The method of claim 28 wherein step (c) comprises downloading directions for locating items scheduled for inspection from a basestation data processing device to a data card, loading the data card into a portable data processing device having a user readable display, and displaying the directions to items scheduled for inspection to the user.

30. The method of claim 29 wherein step (f) further comprises performing reliability centered maintenance (RCM) comprising the steps of downloading RCM questions regarding items scheduled for inspection from a basestation data processing device to a data card, loading the data card into a portable data processing device having a user readable display and user input means, displaying the RCM questions regarding items scheduled for inspection to the user, and entering data from the user in response to the RCM questions into the portable data processing device by the user input means.

31. The method of claim 30 wherein step (a) further comprises assigning a unique machine readable identifying element to items to be inspected and step (g) comprises scanning the identifying element by machine reading means to confirm the detailed inspection action performed for the item.

32. The method of claim 31 wherein said identifying element comprises a bar coded tag having a unique identifying bar code attached to each item requiring inspection and said machine reading means comprises a portable laser bar code scanner.

33. The method of claim 26 wherein step (c) comprises downloading directions for locating items scheduled for inspection from a basestation data processing device to a data card, loading the data card into a portable data processing device having a user readable display, and displaying the directions to items scheduled for inspection to the user.

34. The method of claim 33 wherein step (f) further comprises performing reliability centered maintenance (RCM) comprising the steps of downloading RCM questions regarding items scheduled for inspection from a basestation data processing device to a data card, loading the data card into a portable data processing device having a user readable display and user input means, displaying the RCM questions regarding items scheduled for inspection to the user, and entering data from the user in response to the RCM questions into the portable data processing device by the user input means.

35. The method of claim 34 wherein step (a) further comprises assigning a unique machine readable identifying element to items to be inspected and step (g) comprises scanning the identifying element by machine reading means to confirm the detailed inspection action performed for the item.

36. The method of claim 35 wherein said identifying element comprises a bar coded tag having a unique identifying bar code attached to each item requiring inspection and said machine reading means comprises a portable laser bar code scanner.

37. A system for identifying, organizing, scheduling, executing, analyzing and documenting detailed inspection activities for specific items of equipment in either a time-based or on-demand fashion, comprising:

item identifying means associated with each specific item comprising machine readable means having a unique identifying code associated with each of said specific items;

portable device means comprising portable data processing means having memory means, display means, user data input means, and machine reader means adaptable to reading said machine readable means whereby said unique identifying code associated with each of said specific items may be stored in said memory means of said portable device;

basestation data processing means having user data input means for entering user defined data; memory means for storing a database comprising said user defined data, data identifying said items, data relating to past inspections of said items, data providing directions to the geographical location of said items, and data providing instructions for inspection actions for said items; and scheduling software means for generating a schedule of inspection of said items; and data transfer means for transferring said schedule from said basestation data processing means to said portable device, and for transferring data between said portable device and said basestation data processing means.

38. The system of claim 37 wherein said data relating to past inspections of said items comprises for each of said items the interval of time elapsed since the last inspection of each of said items, said user defined data comprises data organizing said items into classifications and assigning criticality weighting factors to said items and to said classifications, and said scheduling software means comprises ranking software means calculating a ranking of said items scheduled for inspection derived from said criticality weight factors and said interval of time elapsed since the last inspection of each of said items.

39. The system of claim 38 wherein said item identifying means comprises a tag affixed in the vicinity of said item having a bar coded identifying code displayed thereon.

40. The system of claim 39 wherein said machine reader means of said portable device comprises a laser bar code scanner.

41. The system of claim 40 wherein said data transfer means comprises a data card, basestation data card reading and writing means associated with said basestation data processing means, and portable device data card reading and writing means associated with said portable device.

42. The system of claim 41 wherein said data card is a PCMCIA card.

\* \* \* \* \*